US012687769B2

(12) United States Patent
Baek et al.

(10) Patent No.: US 12,687,769 B2
(45) Date of Patent: Jul. 21, 2026

(54) ELECTRONIC APPARATUS

(71) Applicant: Samsung Electronics Co., Ltd.,
Suwon-si (KR)

(72) Inventors: Wonjun Baek, Suwon-si (KR);
Hyungchul Kim, Suwon-si (KR); **Jean
Hur**, Suwon-si (KR)

(73) Assignee: **SAMSUNG ELECTRONICS CO.,
LTD.**, Suwon-si (KR)

( * ) Notice: Subject to any disclaimer, the term of this
patent is extended or adjusted under 35
U.S.C. 154(b) by 281 days.

(21) Appl. No.: 18/636,771

(22) Filed: Apr. 16, 2024

(65) Prior Publication Data

US 2024/0280887 A1     Aug. 22, 2024

Related U.S. Application Data

(63) Continuation of application No.
PCT/KR2022/015446, filed on Oct. 13, 2022.

(30) Foreign Application Priority Data

Nov. 22, 2021     (KR) ........................ 10-2021-0161619

(51) Int. Cl.
*G03B 21/14*     (2006.01)
*G03B 21/00*     (2006.01)

(52) U.S. Cl.
CPC .......... *G03B 21/145* (2013.01); *G03B 21/006*
(2013.01)

(58) Field of Classification Search
CPC .... G03B 21/006; G03B 21/14; G03B 21/145;
G03B 21/54
See application file for complete search history.

(56) References Cited

U.S. PATENT DOCUMENTS 5,537,170 A * 7/1996 Lee ........................ H04N 9/317
353/101
6,652,104 B2 * 11/2003 Nishida ................ H04N 9/3185
353/69

(Continued)

FOREIGN PATENT DOCUMENTS

JP         2005276487 A     10/2005
JP         2007285441 A     11/2007

(Continued)

OTHER PUBLICATIONS

Extended European Search Report dated Dec. 3, 2024 in European
Patent Application No. 22895856.7.

(Continued)

*Primary Examiner* — Michael B. Pierorazio
(74) *Attorney, Agent, or Firm* — Nixon & Vanderhye,
P.C.

(57) ABSTRACT

An example electronic apparatus may include a main body
having an upper surface at which a projection lens is
disposed and a side surface at which a nut is disposed; a
support including a base plate and a support member having
a first end connected to the base plate and a second end
facing the side surface of the main body; and a hinge module
configured to rotatably connect the main body to the support
member, wherein the hinge module includes a first hinge
member having a first end fixed to the side surface of the
main body and a second end at which a first teethed part is
formed and a second hinge member having a first end fixed
to the support member and a second end at which a second
teethed part configured to engage with the first teethed part
is formed.

15 Claims, 19 Drawing Sheets

(56) References Cited

U.S. PATENT DOCUMENTS

| | | | | |
|---|---|---|---|---|
| 6,877,863 B2 * | 4/2005 | Wood | H04N 9/3185 | 353/42 |
| 7,070,283 B2 * | 7/2006 | Akutsu | H04N 5/74 | 353/30 |
| 7,182,466 B2 * | 2/2007 | Sunaga | H04N 5/74 | 353/69 |
| 7,270,421 B2 * | 9/2007 | Shinozaki | G03B 21/142 | 353/121 |
| 7,359,575 B2 * | 4/2008 | Bassi | G06T 3/18 | 345/427 |
| 7,441,906 B1 * | 10/2008 | Wang | G03B 21/14 | 353/121 |
| 7,748,670 B1 * | 7/2010 | Veldez | F16M 13/02 | 248/181.2 |
| 7,782,387 B2 * | 8/2010 | Azuma | H04N 23/698 | 359/662 |
| 10,859,898 B2 * | 12/2020 | Hou | H04N 9/3194 | |
| 10,935,877 B2 * | 3/2021 | Tsai | G03B 21/2053 | |
| 11,256,165 B2 * | 2/2022 | Tsai | H04N 9/3144 | |
| 2002/0051095 A1 * | 5/2002 | Su | H04N 9/3194 | 348/745 |
| 2002/0122161 A1 * | 9/2002 | Nishida | H04N 9/3194 | 353/70 |
| 2003/0191836 A1 * | 10/2003 | Murtha | H04L 67/02 | 709/224 |
| 2003/0210381 A1 * | 11/2003 | Itaki | H04N 5/74 | 353/70 |
| 2004/0156024 A1 * | 8/2004 | Matsuda | H04N 9/3185 | 353/70 |
| 2005/0046803 A1 * | 3/2005 | Akutsu | H04N 5/74 | 353/69 |
| 2005/0073661 A1 * | 4/2005 | Tamura | H04N 9/3194 | 353/70 |
| 2005/0151934 A1 * | 7/2005 | Akutsu | G03B 21/147 | 353/69 |
| 2005/0237492 A1 * | 10/2005 | Shinozaki | H04N 9/3185 | 353/69 |
| 2006/0098167 A1 * | 5/2006 | Sato | G03B 21/26 | 353/35 |
| 2006/0203207 A1 * | 9/2006 | Ikeda | H04N 9/3185 | 353/70 |
| 2006/0256304 A1 * | 11/2006 | Rodems | G03B 21/54 | 353/119 |
| 2007/0008344 A1 * | 1/2007 | Medina | G06T 15/10 | 345/647 |
| 2007/0257941 A1 * | 11/2007 | Plut | G06F 9/451 | 345/660 |
| 2007/0285626 A1 * | 12/2007 | Miyasaka | G03B 21/206 | 353/85 |
| 2009/0278999 A1 * | 11/2009 | Ofune | H04N 21/47 | 348/E3.048 |
| 2010/0002123 A1 * | 1/2010 | Nozaki | G03B 17/54 | 348/E5.022 |
| 2010/0045942 A1 * | 2/2010 | Furui | H04N 9/3194 | 353/69 |
| 2011/0085044 A1 * | 4/2011 | Noda | G03B 21/58 | 348/E5.133 |
| 2011/0210979 A1 * | 9/2011 | Furui | G03B 37/04 | 345/619 |
| 2011/0234994 A1 * | 9/2011 | Uchiyama | H04N 9/3185 | 353/121 |
| 2011/0285971 A1 * | 11/2011 | Oka | H04N 9/3185 | 353/70 |
| 2011/0292351 A1 * | 12/2011 | Ishii | H04N 9/3185 | 353/69 |
| 2012/0224152 A1 * | 9/2012 | Kelly | F16M 11/2014 | 353/100 |
| 2018/0158102 A1 * | 6/2018 | Choi | G06Q 30/0251 | |
| 2019/0041731 A1 * | 2/2019 | Katayama | H04N 9/3144 | |
| 2023/0011961 A1 * | 1/2023 | Shen | F21V 19/003 | |

FOREIGN PATENT DOCUMENTS

| | | |
|---|---|---|
| KR | 20010010898 A | 2/2001 |
| KR | 200235701 Y1 | 10/2001 |
| KR | 100641415 B1 | 10/2006 |
| KR | 100884410 B1 | 2/2009 |
| KR | 101210500 B1 | 12/2012 |
| KR | 101230898 B1 | 2/2013 |
| KR | 101285960 B1 | 7/2013 |
| KR | 20140060063 A | 5/2014 |
| KR | 20180002619 A | 1/2018 |

OTHER PUBLICATIONS

International Search Report for PCT/KR2022/015446 mailed Jan. 26, 2023, 4 pages.
Written Opinion of the ISA for PCT/KR2022/015446 mailed Jan. 26, 2023, 4 pages.

* cited by examiner

ELECTRONIC APPARATUS

CROSS-REFERENCE TO RELATED APPLICATIONS

This application is a continuation of International Application No. PCT/KR2022/015446 designating the United States, filed on Oct. 13, 2022, in the Korean Intellectual Property Receiving Office and claiming priority to Korean Patent Application No. 10-2021-0161619, filed on Nov. 22, 2021, in the Korean Intellectual Property Office, the disclosures of each of which are incorporated by reference herein in their entireties.

BACKGROUND

Field

The disclosure relates to an electronic apparatus and a method control of controlling the same, and for example, to an electronic apparatus having a hinge structure improved to easily adjust and fix a rotation angle of a main body with respect to a support member.

Description of Related Art

An electronic apparatus that performs a projection function may have a main body capable of being rotated with respect to a support member to change an image projection position. In this case, the main body may be connected to the support member to be rotatable by a highly precise connection part (e.g., a gear or a bearing).

If some or all of the above-mentioned precision connection parts are damaged, replacement of the parts may not be easy and may be excessively expensive. Alternatively, if the main body is connected to the rotatable support member by a low-cost connection part, wear and damage to the connecting part may easily occur as the main body is rotated.

SUMMARY

Embodiments of the disclosure may provide an electronic apparatus having a hinge structure for easily adjusting and fixing a rotation angle of a main body with respect to a support member.

According to an example embodiment, an electronic apparatus may include a main body having an upper surface where a projection lens is disposed and a side surface where a nut is formed; a support including a base plate and a support member having one end connected to the base plate and the other end facing the side surface of the main body; and a hinge configured to connect the main body to the support member to be rotatable, wherein the hinge includes a first hinge member having a first end fixed to the side surface of the main body and a second end where a first tooth is formed in a circumferential direction, a second hinge having a first end fixed to the support member and a second end where a second tooth engaged with the first tooth is formed, and a screw passing through the support member and the second hinge member to be engaged with the nut.

In an example embodiment, the first tooth may protrude in an axial direction from a first surface of the first hinge member that faces the support member, and the second tooth may protrude in the axial direction from a first surface of the second hinge member that faces the main body.

In an example embodiment, the hinge module may include an elastic member disposed between the main body and the first hinge member to press the first hinge member.

In an example embodiment, the first hinge member may include a third tooth protruding from its inner surface in a radial direction while crossing the first tooth, and the second hinge member may include a fourth tooth engaged with the third tooth.

In an example embodiment, the fourth tooth may include a plurality of interlocking protrusions protruding in the axial direction from the first surface of the second hinge member that faces the main body and arranged at a certain gap in the circumferential direction.

In an example embodiment, the nut may have a cylindrical shape enabling the screw to be inserted into the inside of the nut, and the first hinge member may surround an outer surface of the nut.

In an example embodiment, the first hinge member may include a plurality of key protrusions protruding from an outer surface of the first hinge member in a radial direction and gradually further away from or closer to the main body in the circumferential direction, and the second hinge member may include a stick member protruding in an axial direction from its one surface facing the main body, and generating a sound by its collision with the plurality of key protrusions when the first hinge member is rotated.

In an example embodiment, when the main body has a first position where the main body is parallel to the support member, the stick member may be in contact with a first key protrusion among the plurality of key protrusions, and the plurality of key protrusions may be gradually further away from or closer to the main body as the key protrusion is further away from the first key protrusion.

In an example embodiment, the screw may include a head disposed outside the support member, a fastener having a first end connected to the head and an outer surface on which a thread is formed, and a pair of guide parts facing each other and extending from a second end of the fastener to be further away from a central axis of the screw.

In an example embodiment, the nut may include a first hole disposed in a first surface thereof the support member, and a second hole disposed in a second surface thereof passed through by the guide part.

In an example embodiment, the guide part may include a fastening protrusion protruding from an outer surface thereof in contact with the second surface of the nut.

In an example embodiment, the first tooth may protrude in a radial direction from an inner surface of the first hinge member, and the second tooth may protrude in the radial direction from an outer surface of the second hinge member.

In an example embodiment, the first hinge member may include a guide protrusion protruding from an inner surface thereof a radial direction, the second hinge member may include a groove disposed in one area of an outer surface thereof having a shape enabling the groove to be engaged with the guide protrusion, and the guide protrusion may be selectively inserted into the groove as the first hinge member is rotated.

In an example embodiment, the plurality of grooves may be spaced apart from each other by a gap of 90 degrees in the circumferential direction.

In an example embodiment, at least one area of the guide protrusion or at least one area of the second hinge member may be made of a flexible material.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Embodiments described below are illustratively provided to assist in understanding of the present disclosure, and it is to be understood that the present disclosure may be variously modified and executed different from the example embodiments described herein. Detailed descriptions of well-known functions or components related to the present disclosure may be omitted so as to not unnecessarily obscure the various example embodiments of the present disclosure. In addition, the accompanying drawings may not be illustrated to scale, and sizes of some of components may be exaggerated to assist in the understanding of the present disclosure.

Terms used in the specification and the claims are selected in consideration of their functions in the present disclosure. However, these terms may be changed based on intentions of those skilled in the art to which the present disclosure pertains, legal or technical interpretations, and emergences of new technology. In addition, some terms are arbitrarily selected by the applicant. Such terms term may be interpreted to have meanings defined in the specification, and if there is no specific definition of the term, the term may be interpreted based on a general content of the specification and common technical knowledge in the art.

In the present disclosure, an expression "have", "may have", "include", "may include", or the like, indicates the existence of a corresponding feature (for example, a numerical value, a function, an operation, or a component such as a part), but does not exclude the existence of an additional feature(s).

In addition, the specification describes components for describing each embodiment of the present disclosure, and is not necessarily limited thereto. Accordingly, some components may be changed or omitted, and other components may be added. In addition, the components may be distributed and arranged in different independent devices.

Further, the embodiments of the present disclosure are described in detail with reference to the accompanying drawings and the contents shown in the accompanying drawings, and the present disclosure is not limited or restricted to the embodiments.

Hereinafter, the present disclosure is described in more detail with reference to the accompanying drawings.

Figure 1:
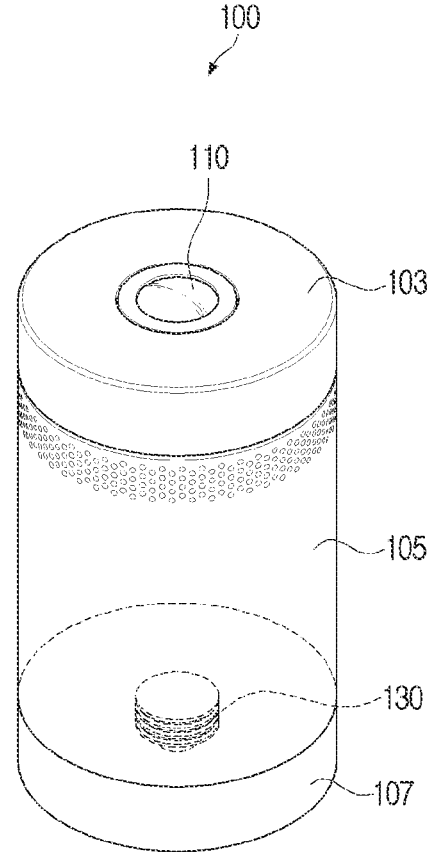
FIG. 1 is a perspective view illustrating an exterior of an example electronic apparatus according to various embodiments.

FIG. 1 is a perspective view illustrating an exterior of an example electronic apparatus 100 according to various embodiments.

Referring to FIG. 1, the electronic apparatus 100 may include a head 103, a main body 105, a projection lens 110, a connector 130, or a cover 107.

The electronic apparatus 100 may implemented in various forms. For example, the electronic apparatus 100 may be a projector device that enlarges and projects an image to a wall or a screen, and the projector device may be a liquid crystal display (LCD) projector or a digital light processing (DLP) type projector that uses a digital micromirror device (DMD).

In addition, the electronic apparatus 100 may be a home or industrial display device, an illumination device used in daily life, or an audio device including an audio module. The electronic apparatus 100 may be implemented as a portable communication device (e.g., smartphone), a computer device, a portable multimedia device, a wearable device, a home appliance device, or the like. The electronic apparatus 100 according to an embodiment of the present disclosure is not limited to the above-described devices, and may be implemented as an electronic apparatus 100 having two or more functions of the above-described devices. For example, the electronic apparatus 100 may be used as a display device, an illumination device and/or an audio device while its projector function is turned off and its illumination function or a speaker function is turned on based on a manipulation of a processor(s), or may be used as an artificial intelligence (AI) speaker including a microphone or a communication device.

The main body 105 is a housing constituting the exterior, and may support or protect components of the electronic apparatus 100 (e.g., components illustrated in FIG. 2) that are arranged inside the main body 105. A shape of the main body 105 may be close to a cylindrical shape as illustrated in FIG. 1. However, the shape of the main body 105 is not limited thereto, and according to various embodiments of the present disclosure, the main body 105 may be implemented in various geometrical shapes such as a column having polygonal cross sections, a cone, a sphere, or the like.

The main body 105 may have a size enabling the main body to be gripped or moved by a user with one of his/her hands, or may be implemented in a micro size enabling the main body to be easily carried by the user or a size enabling the main body to be held on a table or coupled to the illumination device.

A material of the main body 105 may be matt metallic or synthetic resin so that a user's fingerprint or dust does not smear the main body. Alternatively, the exterior of the main body 105 may be made of a slick glossy material.

The main body 105 may have a friction area formed in a partial area of the exterior of the main body 105 for a user to grip and move the main body 105. Alternatively, the main body 105 may have a bent (or bendable) gripping part or a support 108*a* (refer to FIG. 3) positioned in at least a partial area for the user to grip the corresponding part.

The projection lens 110 may be formed on one surface of the main body 105, and project light passed through a lens array to outside the main body 105. The projection lens 110 according to various example embodiments of the present disclosure may be an optical lens low-dispersion coated for reducing chromatic aberration. The projection lens 110 may be a convex lens or a condensing lens, and the projection lens 110 according to various example embodiments of the present disclosure may adjust a focus by adjusting positions of a plurality of sub lenses.

The head 103 may be coupled to one surface of the main body 105 to thus support and protect the projection lens 110. The head 103 may be coupled to the main body 105 so as to be swiveled within a predetermined angle range based on one surface of the main body 105.

The head 103 may be automatically or manually swiveled by a user or a processor(s) to thus freely adjust a projection angle of the projection lens 110. Alternatively, the head 103 may include a neck that is coupled to the main body 105 and extends from the main body 105, and the head 103 may thus adjust the projection angle of the projection lens 110 by being tilted backward or forward.

The electronic apparatus 100 may project light or an image to a desired position by adjusting the projection angle of the projection lens 110 while adjusting a direction of the head 103 in a state in which the position and angle of the main body 105 are fixed. In addition, the head 103 may include a handle that the user may grip after rotating the head in a desired direction.

A plurality of openings may be formed in an outer circumferential surface of the main body 105. Through the plurality of openings, audio output from an audio outputter may be output to outside the main body 105 of the electronic apparatus 100. The audio outputter may include a speaker, and the speaker may be used for general uses such as reproduction of multimedia or reproduction of a recording, and output of a voice.

According to various example embodiments of the present disclosure, the main body 105 may include a radiation fan provided therein, and in a case that the radiation fan is operated, air or heat in the main body 105 may be discharged through the plurality of openings. Accordingly, the electronic apparatus 100 may discharge heat occurring due to the driving of the electronic apparatus 100 to the outside, and prevent or reduce overheating of the electronic apparatus 100.

The connector 130 may connect the electronic apparatus 100 with an external device to transmit or receive electronic signals, or receive power from the external device. The connector 130 according to example embodiments of the present disclosure may be physically connected with the external device. The connector 130 may include an input/output interface to connect its communication with the external device in a wired or wireless manner or receive the power from the external device. For example, the connector 130 may include a high-definition multimedia interface (HDMI) connection terminal, a universal serial bus (USB) connection terminal, a secure digital (SD) card accommodating groove, an audio connection terminal, or a power outlet. Alternatively, the connector 130 may include a Bluetooth, wireless-fidelity (Wi-Fi), or wireless charge connection module, connected with the external device in a wireless manner.

In addition, the connector 130 may have a socket structure connected to an external illumination device, and may be connected to a socket accommodating groove of the external illumination device to receive the power. The size and specification of the connector 130 having the socket structure may be implemented in various ways in consideration of an accommodating structure of the external device that may be coupled thereto. For example, a diameter of a joining portion of the connector 130 may be 26 mm according to an international standard E26, and, in this case, the electronic apparatus 100 may be coupled to the external illumination device such as a stand in place of a light bulb that is generally used. When being coupled to a conventional socket positioned on a ceiling, the electronic apparatus 100 may vertically perform the projection. Accordingly, the socket-coupled electronic apparatus 100 cannot be rotated, and in this case, the screen cannot be rotated either. Accordingly, the electronic apparatus 100 may project or rotate the screen to a desired position while being socket-coupled to a stand on the ceiling by allowing the head 103 to swivel on one surface of the main body 105 to have an adjusted projection angle for the electronic apparatus 100 to be rotated even when being socket-coupled and receiving power.

The connector 130 may include a coupling sensor, and the coupling sensor may detect whether the connector 130 is coupled to the external device, its coupling state, or its coupling target, and transmit the same to a processor(s), and the processor(s) may control the driving of the electronic apparatus 100 based on a received detection value.

The cover 107 may be coupled to or separated from the main body 105, and protect the connector 130 so that the connector 130 is not always exposed to the outside. The cover 107 may have a shape continuous with the shape of the main body 105 as illustrated in FIG. 1 or a shape corresponding to the shape of the connector 130. The cover 107 may support the electronic apparatus 100, and the electronic apparatus 100 may be used by being coupled to or held on an external holder while being coupled to the cover 107.

In the electronic apparatus 100 according to the various example embodiments of the present disclosure, a battery may be positioned inside the cover 107. The battery may include, for example, a primary cell that cannot be recharged, a secondary cell that may be recharged, or a fuel cell.

Although not shown in the drawing, the electronic apparatus 100 may include a camera module, and the camera module may capture a still image or a video. According to various example embodiments of the present disclosure, the camera module may include at least one lens, an image sensor, an image signal processor, or a flash.

Although not shown in the drawing, the electronic apparatus 100 may include a protection case so that the electronic apparatus 100 can be easily carried while being protected. Alternatively, the electronic apparatus 100 may include a stand that supports or fixes the main body 105, or a bracket that may be coupled to a wall surface or a partition.

Figure 2:
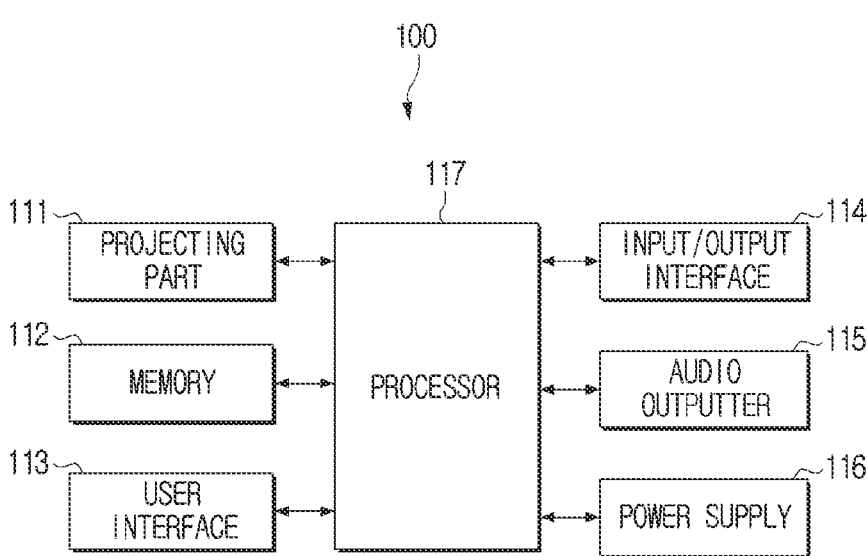
FIG. 2 is a block diagram illustrating a configuration of an example electronic apparatus according to various embodiments.

In addition, the electronic apparatus 100 may be connected with the various external devices using its socket structure, and provide various functions. For example, the electronic apparatus 100 may be connected to an external camera device using the socket structure. The electronic apparatus 100 may provide an image stored in the connected camera device or an image that is currently being captured using a projecting part 111 (FIG. 2). For an another example, the electronic apparatus 100 may be connected to a battery module using the socket structure to receive power. The electronic apparatus 100 may be connected to the external device using the socket structure, which is merely one example, and may be connected to the external device using another interface (e.g., USB).

FIG. 2 is a block diagram illustrating a configuration of an example electronic apparatus according to various embodiments.

Referring to FIG. 2, the electronic apparatus 100 may include a projecting part 111, memory 112, a user interface 113, an input/output interface 114, an audio output device 115, a power supply 116, and a processor 117. The configuration illustrated in FIG. 2 is only an example, from which some components may be omitted, and to which different components may be added.

The projecting part (projector) 111 may be a component that projects the image to the outside. The projecting part 111 according to various example embodiments of the present disclosure may be implemented in various projection types (e.g., cathode-ray tube (CRT) type, liquid crystal display (LCD) type, digital light processing (DLP) type, or laser type). As an example, the CRT type has basically the same principle as a CRT monitor. The CRT type may display an image on a screen by enlarging the image using a lens in front of a cathode-ray tube (CRT). The CRT type may be divided into a one-tube type and a three-tube type based on the number of cathode-ray tubes. In the three-tube type, the cathode-ray tubes of red, green, and blue may be separated from one another.

For an another example, the LCD type may display an image by allowing light emitted from a light source to pass through a liquid crystal. The LCD type may be divided into a single-panel type and a three-panel type. In a case of the three-panel type, the light emitted from the light source may be separated into red, green and blue in a dichroic mirror (which is a mirror that reflects only light of a specific color and allows the rest to pass therethrough), may then pass through the liquid crystal, and may then be collected into one place again.

For an another example, the DLP type may display an image using a digital micromirror device (DMD) chip. The DLP type projecting part may include a light source, a color wheel, a DMD chip, a projection lens, etc. Light emitted from the light source may be colored as passing through a rotating color wheel. Light passed through the color wheel may be input into the DMD chip. The DMD chip may include numerous micromirrors and reflect light input to the DMD chip. The projection lens may expand light reflected from the DMD chip to the image size.

For an another example, the laser type may include a diode pumped solid state (DPSS) laser and a galvanometer. The laser type that outputs various colors may use a laser in which three DPSS lasers are respectively installed for red, green, and blue (RGB) colors, and their optical axes overlap each other using a special mirror. The galvanometer may include a mirror and a high-power motor, and move the mirror at a high speed. For example, the galvanometer may rotate the mirror at up to 40 KHz/sec. The galvanometer may be mounted in a scanning direction, and in general, a projector performs planar scanning, and the galvanometer may thus also be disposed by being divided into x and y axes.

Meanwhile, the projecting part 111 may include light sources of various types. For example, the projecting part 111 may include at least one light source of a lamp, a light emitting diode (LED), or a laser.

The projecting part 111 may output an image in a screen ratio of 4:3, a screen ratio of 5:4, and a wide screen ratio of 16:9, based on a purpose of the electronic apparatus 100, a user's setting or the like, and may output images having various resolutions such as wide video graphics array WVGA (854*480 pixels), super video graphics array SVGA (800*600 pixels), extended graphics array XGA (1024*768 pixels), wide extended graphics array WXGA (1280*720 pixels), WXGA (1280*800 pixels), super extended graphics array SXGA (1280*1024 pixels), ultra extended graphics array UXGA (1600*1200 pixels) and/or full high-definition HD (1920*1080 pixels), based on the screen ratio.

Meanwhile, the projecting part 111 may perform various functions for adjusting an output image under the control of the processor 117. For example, the projecting part 111 may perform a zoom function, a keystone function, a quick corner (or four corner) keystone function and/or a lens shift function, or the like.

For example, the projecting part 111 may enlarge or reduce the image based its distance (i.e., projection distance) from the screen. That is, the projecting part 111 may perform a zoom function based on its distance to the screen. The zoom function may include a hardware method of adjusting a screen size by moving a lens, and/or a software method of adjusting the screen size by cropping the image, or the like. In a case that a zoom function is performed, a focus of the image may be adjusted. For example, a method of adjusting the focus may include a manual focusing method, an electric focusing method, etc. The manual focusing method may, for example, refer to a method of manually adjusting the focus, and the electric focusing method may, for example, refer to a method in which the projector automatically adjusts the focus using a motor built therein when performing the zoom function. When performing the zoom function, the projecting part 111 may provide a digital zoom function through software, and may provide an optical zoom function in which the zoom function is performed by moving the lens using a driving part (driver).

In addition, the projecting part 111 may perform a keystone correction function. When a height does not match a front projection, the screen may be distorted up or down. The keystone correction function may be a function of correcting a distorted screen. For example, in a case that distortion occurs on the screen in a horizontal direction, the distortion may be corrected using a horizontal keystone, and in a case that distortion occurs on the screen in a vertical direction, the distortion may be corrected using a vertical keystone. The quick corner (or four corner) keystone correction function may be a function of correcting distortion in a case that a balance between corner areas of the screen is not appropriate while a central area of the screen is normal.

The lens shift function may, for example, refer to a function of moving the screen as it is in a case that the screen is outside a screen area.

For example, the projecting part 111 may provide the zoom/keystone/focusing functions by automatically analyzing a surrounding environment and a projection environment without user input. Specifically, the projecting part 111 may automatically provide the zoom/keystone/focusing functions, based on the distance between an electronic apparatus 100 and the screen, information about a space where the electronic apparatus 100 is currently positioned, information about an amount of ambient light, or the like, detected by a sensor (e.g., depth camera, distance sensor, infrared sensor, and/or illumination sensor).

In addition, the projecting part 111 may provide an illumination function by using the light source. In particular, the projecting part 111 may provide the illumination function by outputting light using an LED. In an example embodiment, the projecting part 111 may include one LED, and in an another example embodiment, the electronic apparatus may include a plurality of LEDs. The projecting part 111 may output light using a surface-emitting LED in an example embodiment. The surface-emitting LED may, for example, refer to an LED in which an optical sheet is disposed on an upper side of the LED for the light source to be evenly dispersed and output. Specifically, when being output through an LED, light may be evenly dispersed through the optical sheet, and the light dispersed through the optical sheet may be introduced into a display panel.

The projecting part 111 may provide a user with a dimming function for adjusting intensity of the light source. For example, the projecting part 111 may control an LED to output the intensity of the light that corresponds to a received user input when receiving the user input for adjusting the intensity of the light source from the user through the user interface 113 (e.g., touch display button or dial).

For example, the projecting part 111 may provide the dimming function, based on the content analyzed by the processor 117 without user input. For example, the projecting part 111 may control the LED to output the intensity of light, based on information (e.g., content type or content brightness) on the currently-provided content.

The projecting part 111 may control a color temperature under the control of the processor 117. Here, the processor 117 may control a color temperature based on the content. Specifically, in a case that it is identified that content is to be output, the processor 117 may obtain color information for each frame of the content whose output is determined. And, the processor 117 may then control the color temperature based on the obtained color information for each frame. For example, the processor 117 may obtain at least one main color of the frame based on the color information for each frame. And, the processor 117 may then adjust the color temperature based on the obtained at least one main color. For example, the color temperature that the processor 117 may adjust may be divided into a warm type or a cool (cold) type. The frame to be output (hereinafter, output frame) may include a fire scene. The processor 117 may identify (or obtain) that the main color is red based on the color information included in the current output frame. The processor 117 may then identify the color temperature corresponding to the identified main color (red). The color temperature corresponding to the red color may be the warm type. For example, the processor 117 may use an artificial intelligence model to obtain the color information or main color of the frame. In an example embodiment, the artificial intelligence model may be stored in the electronic apparatus 100 (e.g., memory 112). In an example embodiment, the artificial intelligence model may be stored in an external server which may communicate with the electronic apparatus 100.

In an example embodiment, the electronic apparatus 100 may be interlocked with an external device to control the illumination function. For example, the electronic apparatus 100 may receive illumination information from the external device. The illumination information may include at least one of brightness information or color temperature information, set by the external device. The external device may, for example, be a device connected to the same network as the electronic apparatus 100 (e.g., internet of things (IoT) device included in the same home/work network) or a device not connected to the same network as the electronic apparatus 100 but capable of communicating with the electronic apparatus (e.g., remote control server). For example, an external illumination device (e.g., IoT device) included in the same network as the electronic apparatus 100 may output red light having brightness of 50. The external lighting device (e.g., IoT device) may directly or indirectly transmit the illumination information (e.g., information indicating that the red light is being output with the brightness of 50) to the electronic apparatus 100. The electronic apparatus 100 may control the output of the light source based on the illumination information received from the external illumination device. For example, in a case that the illumination information received from the external illumination device includes the information indicating that the red light is output with the brightness of 50, the electronic apparatus 100 may output the red light having a brightness of 50.

In an example embodiment, the electronic apparatus 100 may control the illumination function based on biometric information. For example, the processor 117 may obtain a user's biometric information. For example, the biometric information may include at least one of the body temperature, heart rate, blood pressure, breath or electrocardiogram of the user. The biometric information may include various information other than the aforementioned information. In an example embodiment, the electronic apparatus may include a sensor for measuring the biometric information. The processor 117 may obtain the biometric information of the user through the sensor, and control the output of the light source based on the obtained biometric information. In an example embodiment, the processor 117 may receive the biometric information from the external device through the input/output interface 114. The external device may be a portable communication device (e.g., smartphone or wearable device) of the user. The processor 117 may obtain the biometric information of the user from the external device, and control the output of the light source based on the obtained biometric information. In an example embodiment, the electronic apparatus may identify whether the user is sleeping and the processor 117 may control the output of the light source based on the user's biometric information in a case that it is identified that the user is sleeping (or preparing to sleep).

Memory 112 may store at least one instruction for the electronic apparatus 100. In addition, the memory 112 may store an operating system (O/S) for driving the electronic apparatus 100. The memory 112 may also store various software programs or applications for operating the electronic apparatus 100 in various example embodiments of the present disclosure. Further, the memory 112 may include a semiconductor memory such as a flash memory, or a magnetic storing medium such as a hard disk.

For example, memory 112 may store various software modules or programs for operating the electronic apparatus 100 in the various example embodiments of the present disclosure, and the processor 117 may control the operation of the electronic apparatus 100 by executing the various software modules stored in the memory 112. The processor 117 according to various example embodiments of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The memory 112 may be accessed by the processor 117, and the processor 117 may perform readout, recording, correction, deletion, update and the like of data in the memory 112.

In the present disclosure, the term "memory 112" may include the memory 112, a read only memory (ROM) or a random access memory (RAM) in the processor 117, or a memory card (for example, a micro secure digital (SD) card or a memory stick) mounted in the electronic apparatus 100.

The user interface 113 may include various types of input devices. For example, the user interface 113 may include a physical button. The physical button may, for example, include a function key, a direction key (e.g., a four-direction key), or a dial button. In an example embodiment, the physical button may be implemented as a plurality of keys. In an example embodiment, the physical button may be implemented as one key. In a case that the physical button is implemented as one key, the electronic apparatus 100 may receive user input in which the one key is pressed for a specified time or longer. When receiving the user input in which one key is pressed for the specified time or longer, the processor 117 may perform a function corresponding to the user input. For example, the processor 117 may provide the illumination function based on the user input.

In addition, the user interface 113 may receive user input using a non-contact method. In a case of receiving the user input using a contact method, a physical force may be required to be transmitted to the electronic apparatus. There may thus be a need for a method of controlling the electronic apparatus regardless of the physical force. For example, the user interface 113 may receive a user gesture and may perform an operation corresponding to the received user gesture. The user interface 113 may receive the user gesture through a sensor (e.g., image sensor or infrared sensor).

In addition, the user interface 113 may receive user input using a touch method. For example, the user interface 113 may receive user input through a touch sensor. In an example embodiment, the touch method may be implemented as a non-contact method. For example, the touch sensor may determine whether a user body approaches within a specified distance. The touch sensor may identify the user input even in a case that the user does not touch the touch sensor. In an example embodiment, the touch sensor may identify user input in which a user touches the touch sensor.

The electronic apparatus 100 may receive user input in various ways other than described above. In an example embodiment, the electronic apparatus 100 may receive user input from an external remote control device. The external remote control device may be a remote control device corresponding to the electronic apparatus 100 (e.g., control device dedicated to the electronic apparatus) or a portable communication device (e.g., smartphone or wearable device) of the user. The portable communication device of the user may store an application for controlling the electronic apparatus. The portable communication device may obtain user input from the application stored therein, and transmit the obtained user input to the electronic apparatus 100. The electronic apparatus 100 may receive user input from the portable communication device, and perform an operation corresponding to a user's control command.

The electronic apparatus 100 may receive user input using voice recognition. In an example, the electronic apparatus 100 may receive a user voice through a microphone included in the electronic apparatus. In an example embodiment, the electronic apparatus 100 may receive the user voice from the microphone or an external device. The external device may obtain the user voice through a microphone of the external device, and transmit the obtained user voice to the electronic apparatus 100. The user voice transmitted from the external device may be audio data or digital data converted from the audio data (e.g., audio data converted to a frequency domain). The electronic apparatus 100 may perform an operation corresponding to the received user voice. The electronic apparatus 100 may receive the audio data corresponding to the user voice through a microphone. The electronic apparatus 100 may then convert the received audio data to digital data. The electronic apparatus 100 may then convert the converted digital data to text data using a speech-to-text (STT) function.

In an example embodiment, the speech-to-text (STT) function may be directly performed by the electronic apparatus 100, and in an example embodiment, the speech-to-text (STT) function may be performed by an external server. The electronic apparatus 100 may transmit digital data to the external server. The external server may convert the digital data to text data, and obtain control command data based on the converted text data. The external server may transmit the control command data (which may here also include the text data) to the electronic apparatus 100. The electronic apparatus 100 may perform an operation corresponding to the user voice based on the obtained control command data.

The electronic apparatus 100 may provide a voice recognition function using one assistant (or an artificial intelligence agent such as Bixby™), which is only an example, and the electronic apparatus 100 may provide the voice recognition function by using a plurality of assistants. The electronic apparatus 100 may provide the voice recognition function by selecting one of the plurality of assistants based on a trigger word corresponding to the assistant or a specific key included in a remote controller.

The electronic apparatus 100 may receive the user input using a screen interaction. The screen interaction may refer, for example, to a function in which the electronic apparatus identifies whether a specified event is generated through the image projected to the screen (or projection plane), and obtains the user input based on the specified event. The specified event may, for example, be an event in which a specified object is identified at a specific position (e.g., position to which the UI for receiving the user input is projected). The specified object may include at least one of a user body part (e.g., finger), a pointer, or a laser point. The electronic apparatus 100 may identify that the electronic apparatus 100 receives user input for selecting the projected UI in a case that it is identified that the specified object exists at the position corresponding to the projected UI. For example, the electronic apparatus 100 may project a guide image displaying the UI on the screen. The electronic apparatus 100 may then identify whether the user selects the projected UI. The electronic apparatus 100 may identify that the user selects the projected UI in case that the specified event is identified at the position of the projected UI. The projected UI may include at least one item. The electronic apparatus 100 may perform spatial analysis to identify whether the specified event exists at the position of the projected UI. The electronic apparatus 100 may perform the spatial analysis through the sensor (e.g., image sensor, infrared sensor, depth camera, or distance sensor). The electronic apparatus 100 may identify whether the specified event is generated at the specific position (i.e., position to which the UI is projected) by performing spatial analysis. In addition, in a case that it is identified that the specified event is generated at the specific position (i.e., position to which the UI is projected), the electronic apparatus 100 may identify that the electronic apparatus 100 receives user input for selecting the UI corresponding to the specific position.

The input/output interface 114 is a component for inputting or outputting at least one of an audio signal or an image signal. The input/output interface 114 may receive at least one of the audio signal or the image signal from an external device, and output the control command to the external device.

The input/output interface 114 according to various example embodiments of the present disclosure may be implemented as a wired input/output interface of at least one of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB) or a digital visual interface (DVI). In an example embodiment, the wired input/output interface may be implemented as an interface inputting or outputting only an audio signal and an interface inputting or outputting only an image signal, or implemented as one interface inputting or outputting both an audio signal and an image signal.

In addition, the electronic apparatus 100 may receive data through the wired input/output interface, which is only an example, and the electronic apparatus 100 may receive power through the wired input/output interface. For example, the electronic apparatus 100 may receive power from an external battery through the USB C-type interface, or receive power from an outlet through a power adapter. In an example embodiment, the electronic apparatus may receive power from the external device (e.g., laptop computer or monitor) through the display port (DP).

The input/output interface 114 according to various example embodiments of the present disclosure may be implemented as a wireless input/output interface that performs the communication using at least one of wireless communication methods such as wireless-fidelity (Wi-Fi), Wi-Fi direct, Bluetooth, ZigBee, third generation (3G), 3rd generation partnership project (3GPP), or long term evolution (LTE). In an example embodiment, the wireless input/output interface may be implemented as an interface inputting or outputting only an audio signal and an interface inputting or outputting only an image signal, or implemented as one interface inputting or outputting both an audio signal and an image signal.

In addition, the audio signal may be input through the wired input/output interface, and the image signal may be input through a wireless input/output interface. Alternatively, the audio signal may be input through the wireless input/output interface, and the image signal may be input through the wired input/output interface.

The audio outputter 115 is a component that outputs the audio signal. For example, the audio outputter 115 may include an audio output mixer, an audio signal processor, and/or an audio output module. The audio output mixer may mix a plurality of audio signals to be output as at least one audio signal. In an example embodiment, the audio output mixer may mix an analog audio signal and another analog audio signal (e.g., analog audio signal received from the outside) as at least one analog audio signal. The audio output module may include a speaker or an output terminal. According to an example embodiment, the audio output module may include a plurality of speakers. In this case, the audio output module may be disposed in the main body, and audio emitted while covering at least a portion of a diaphragm of the audio output module may pass through a waveguide to be transmitted to the outside of the main body. The audio output module may include a plurality of audio output units, and the plurality of audio output units may be symmetrically arranged on the exterior of the main body, and accordingly, the audio may be emitted to all directions, i.e., all directions in 360 degrees.

The power supply 116 may receive power from the outside and supply power to the various components of the electronic apparatus 100. The power supply 116 according to various example embodiments of the present disclosure may receive power in various ways. In an example embodiment, the power supply 116 may receive power using connector 130 having a socket structure as illustrated in FIG. 1. The power supply 116 may receive power by using a direct current (DC) power cord of 220V. However, the present disclosure is not limited thereto, and the electronic apparatus may receive power using a USB power cord, or may receive power using a wireless charging method.

In addition, the power supply 116 may receive power using an internal battery or an external battery. The power supply 116 according to an example embodiment of the present disclosure may receive power through an internal battery. For example, the power supply 116 may charge power of the internal battery using at least one of a DC power cord of 220V, a USB power cord, or a USB C-Type power cord, and may receive power through the charged internal battery. In addition, the power supply 116 according to an example embodiment of the present disclosure may receive power through an external battery. For example, the power supply 116 may receive power through the external battery in a case that the electronic apparatus and the external battery is connected through various wired communication methods such as a USB power cord, a USB C-type power cord, or a socket groove. That is, the power supply 116 may directly receive power from the external battery, or charge the internal battery through the external battery and receive power from the charged internal battery.

The power supply 116 according to various example embodiments of the present disclosure may receive power using at least one of the aforementioned plurality of power supply methods.

With respect to power consumption, the electronic apparatus 100 may have a power consumption of a specified value (e.g., 43 W) or less due to a socket type, another standard, etc. The electronic apparatus 100 may change power consumption to reduce the power consumption when using a battery. That is, the electronic apparatus 100 may change power consumption based on the power supply method, power usage amount, or the like.

The electronic apparatus 100 according to various example embodiments of the present disclosure may provide various smart functions.

For example, the electronic apparatus 100 may be connected to a portable terminal device controlling the electronic apparatus 100, and the screen output from the electronic apparatus 100 may be controlled by user input which is input from the portable terminal device. In an example embodiment, the portable terminal device may be implemented as a smartphone including a touch display, the electronic apparatus 100 may receive screen data provided by the portable terminal device from the portable terminal device and output the data, and the screen output by the electronic apparatus 100 may be controlled based on the user input that is input from the portable terminal device.

The electronic apparatus 100 may be connected to the portable terminal device using various communication methods such as miracast, airplay, wireless dalvik executable (DEX) and a remote personal computer (PC) method, and may share content or music, provided by the portable terminal device.

In addition, the portable terminal device and the electronic apparatus 100 may be connected to each other by various connection methods. In an example, the portable terminal device may search for the electronic apparatus 100 and perform wireless connection therebetween, or the electronic apparatus 100 may search for the portable terminal device and perform the wireless connection therebetween. The electronic apparatus 100 may then output content provided from the portable terminal device.

In an example embodiment, while specific content or music is being output from a mobile terminal device, the electronic apparatus 100 may output the content or music being output from the portable terminal device in a case that the portable terminal device is positioned around the electronic apparatus and a specified gesture (e.g., motion tap view) is then detected through the display of the portable terminal device, while the specific content or music is being output from the portable terminal device.

In an example embodiment, while specific content or music is being output from a mobile terminal device, the electronic apparatus 100 may output the content or music being output from the portable terminal device in a case that it is detected that the portable terminal device is positioned around the electronic apparatus 100 by a specified distance or less (e.g., non-contact tap view), or the portable terminal device touches the electronic apparatus 100 twice at short intervals (e.g., contact tap view) in a state in which specific content or music is being output from the portable terminal device.

In an example embodiment, the screen provided by the portable terminal device may be the same as the screen provided by the electronic apparatus 100. However, the present disclosure is not limited thereto. That is, in a case in which the portable terminal device and the electronic apparatus 100 are connected to each other, the portable terminal device may output a first screen provided by the portable terminal device, and the electronic apparatus 100 may output a second screen provided by the portable terminal device, which is different from the first screen. In an example embodiment, the first screen may be a screen provided by a first application installed in the portable terminal device, and the second screen may be a screen provided by a second application installed in the portable terminal device. In an example embodiment, the first screen and the second screen may be screens different from each other that are provided by one (the same) application installed in the portable terminal device. In addition, in an example embodiment, the first screen may be a screen including a UI in a remote controller form for controlling the second screen.

The electronic apparatus 100 according to various example embodiments may output a standby screen. For example, the electronic apparatus 100 may output a standby screen in a case that the electronic apparatus 100 and the external device are not connected to each other or in a case that there is no input received from the external device for a specified time. A condition for the electronic apparatus 100 to output a standby screen is not limited to the above-described examples, and a standby screen may be output based on various conditions.

The electronic apparatus 100 may output a standby screen in the form of a blue screen, and the present disclosure is not limited thereto. For example, the electronic apparatus 100 may obtain an atypical object by extracting only a shape of a specific object from data received from an external device, and output the standby screen including the obtained atypical object.

Figure 3:
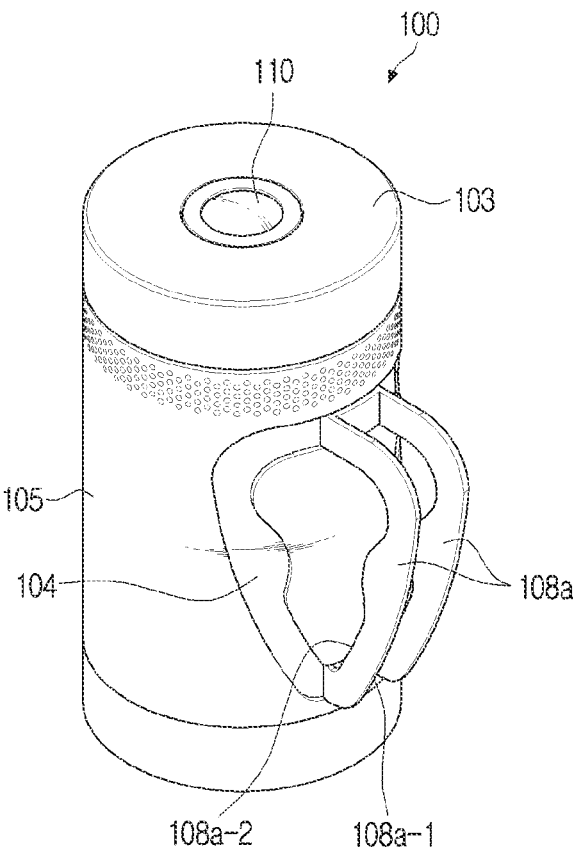
FIG. 3 is a perspective view illustrating an exterior of an example electronic apparatus according to various embodiments.

FIG. 3 is a perspective view illustrating an exterior of an example electronic apparatus 100 according to various embodiments of the present disclosure.

Referring to FIG. 3, the electronic apparatus 100 may include a support (or "a handle") 108*a*.

The support 108*a* in various examples may be a handle or a ring that is provided for the user to grip or move the electronic apparatus 100. Alternatively, the support 108*a* may be a stand that supports the main body 105 while the main body 105 is laid sideways.

As illustrated in FIG. 3, the support 108*a* may have a hinge structure for the support to be coupled to or separated from an outer circumferential surface of the main body 105, and may be selectively separated from or fixed to the outer circumferential surface of the main body 105 based on a user's need. The number, shape, or disposition structure of the support 108*a* may be implemented in various ways without restriction. Although not shown in the drawing, the support 108*a* may be built in the main body 105, and taken out and used by the user based on user need. Alternatively, the support 108*a* may be implemented as a separate accessory, and attached to or detached from the electronic apparatus 100.

The support 108*a* may include a first support surface 108*a*-1 and a second support surface 108*a*-2. The first support surface 108*a*-1 may be a surface that faces the outside of the main body 105 while the support 108*a* is separated from the outer circumferential surface of the main body 105, and the second support surface 108*a*-2 may be a surface that faces the inside of the main body 105 while the support 108*a* is separated from the outer circumferential surface of the main body 105.

The first support surface 108*a*-1 may be developed from the lower portion to upper portion of the main body 105 to be farther away from the main body 105, and the first support surface 108*a*-1 may have a flat or uniformly curved shape. The first support surface 108*a*-1 may support the main body 105 in a case the electronic apparatus 100 is held in such a manner that the outer side surface of the main body 105 is in contact with the bottom, i.e., in a case that the electronic apparatus 100 is disposed in such a manner that the projection lens 110 is toward the front. In an example embodiment in which the electronic apparatus 100 includes two or more supports 108*a*, the head 103 and the projection angle of the projection lens 110 may be adjusted by adjusting the interval or hinge opening angle of the two supports 108*a*.

The second support surface 108*a*-2 may be a surface touched by the user or an external holding structure in a case that the support 108*a* is supported by the user or the external holding structure, and may have a shape corresponding to a gripping structure of the user's hand or the external holding structure for the electronic apparatus 100 not to slip in a case that the electronic apparatus 100 is supported or moved. The user may move the electronic apparatus 100 by making the projection lens 110 face toward the front, fixing the head 103 and holding the support 108*a*, and use the electronic apparatus 100 like a flashlight.

The support groove 104 may be a groove structure which is provided in the main body 105 and accommodates the support 108*a* in a case that the support 108*a* is not used. As illustrated in FIG. 3, the support groove 104 may, for example, be implemented as a groove structure corresponding to the shape of the support 108*a* in the outer circumferential surface of the main body 105. By using the support groove 104, the support 108*a* may be stored on the outer circumferential surface of the main body 105 in a case that the support 108*a* is not used, and the outer circumferential surface of the main body 105 may be maintained to be slick.

In various example embodiments, the support 108*a* may be stored inside the main body 105, and may be taken out to the outside of the main body 105 in a case that the support 108*a* is needed. In this case, the support groove 104 may lead into the inside of the main body 105 to accommodate the support 108*a*, and the second support surface 108*a*-2 may have a door that adheres to the outer circumferential surface of the main body 105 or opens or closes the separate support groove 104.

Although not shown in the drawing, the electronic apparatus 100 may include various kinds of accessories that are helpful in using or storing the electronic apparatus 100. For example, the electronic apparatus 100 may include a protection case for the electronic apparatus 100 to be easily carried while being protected. Alternatively, the electronic apparatus 100 may include a tripod that supports or fixes the main body 105, or a bracket that may be coupled to the outer surface of the electronic apparatus and fix the electronic apparatus 100.

Figure 4:
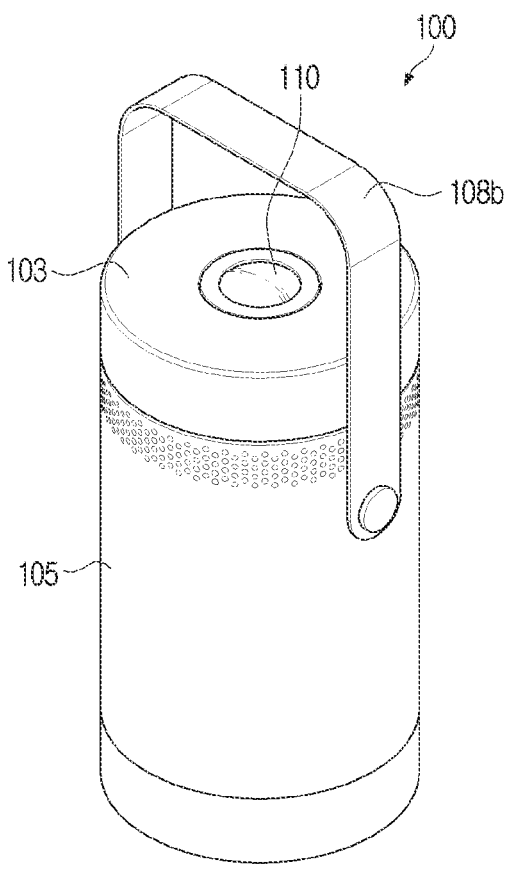
FIG. 4 is a perspective view illustrating an exterior of an example electronic apparatus according to various embodiments.

FIG. 4 is a perspective view illustrating an exterior of an example electronic apparatus according to various embodiments of the present disclosure.

Referring to FIG. 4, the electronic apparatus 100 may include a support (or a "handle") 108*b*.

The support 108*b* in various example embodiments may be a handle or a ring that is provided for the user to grip or move the electronic apparatus 100. Alternatively, the support 108*b* may be a stand that supports the main body 105 to be oriented at any angle while the main body 105 is laid sideways.

As illustrated in FIG. 4, the support 108*b* may be connected with the main body 105 at a predetermined point (e.g., ⅔ to ¾ point of a height of the main body) of the main body 105. In a case that the support 108 is rotated toward the main body, the support 108*b* may support the main body 105 for the main body 105 to be oriented at any angle while the main body 105 is laid sideways.

Figure 5:
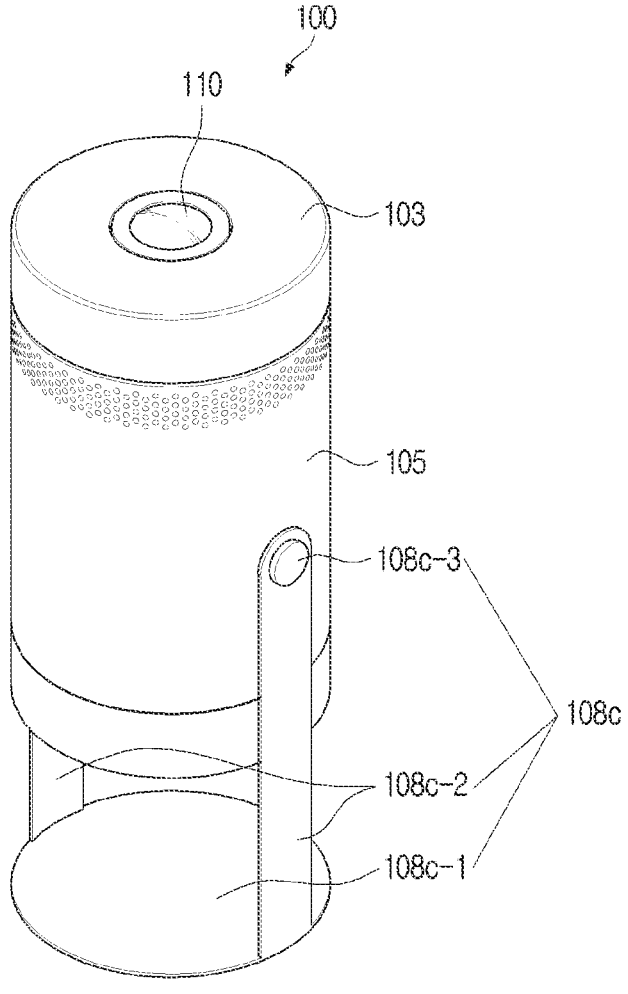
FIG. 5 is a perspective view illustrating an exterior of an example electronic apparatus according to various embodiments.

FIG. 5 is a perspective view illustrating an exterior of an example electronic apparatus according to various embodiments of the present disclosure.

Referring to FIG. 5, the electronic apparatus 100 may include a support (or a "handle") 108*c*. The support 108*c* in various example embodiments may include a base plate 108*c*-1 supporting the electronic apparatus 100 on the ground and two support members 108*c*-2 connecting the base plate 108*c*-1 with the main body 105.

In an example embodiment of the present disclosure, the two support members 108*c*-2 may have the same height, and one cross section of each of the two support members 108*c*-2 may be coupled to or separated from each other by a groove and a hinge member 108*c*-3 provided on one outer circumferential surface of the main body 105.

The two support members may be hinge-coupled to the main body 105 at a predetermined point (e.g., ⅓ to ⅔ point of the height of the main body) of the main body 105.

In a case that the two support members and the main body are coupled with each other by the hinge member 108*c*-3, the main body 105 may be rotated based on a virtual horizontal axis formed by the two hinge members 108*c*-3, thus adjusting the projection angle of the projection lens 110.

FIG. 5 illustrates an example embodiment in which the two support members 108*c*-2 are connected with the main body 105, but the present disclosure is not limited thereto. For example, in FIGS. 6A and 6B, one support member and the main body 105 may be connected with each other by one hinge member.

Figure 6A:
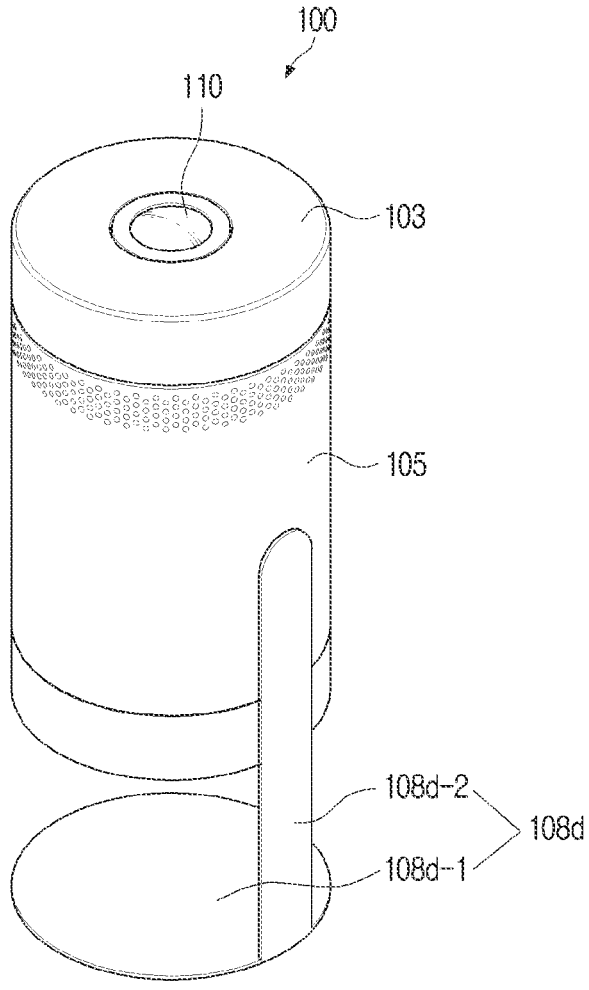
FIG. 6A is a perspective view illustrating an exterior of an example electronic apparatus according to various embodiments.

FIG. 6A is a perspective view illustrating an exterior of an example electronic apparatus according various embodiments of the present disclosure.

Figure 6B:
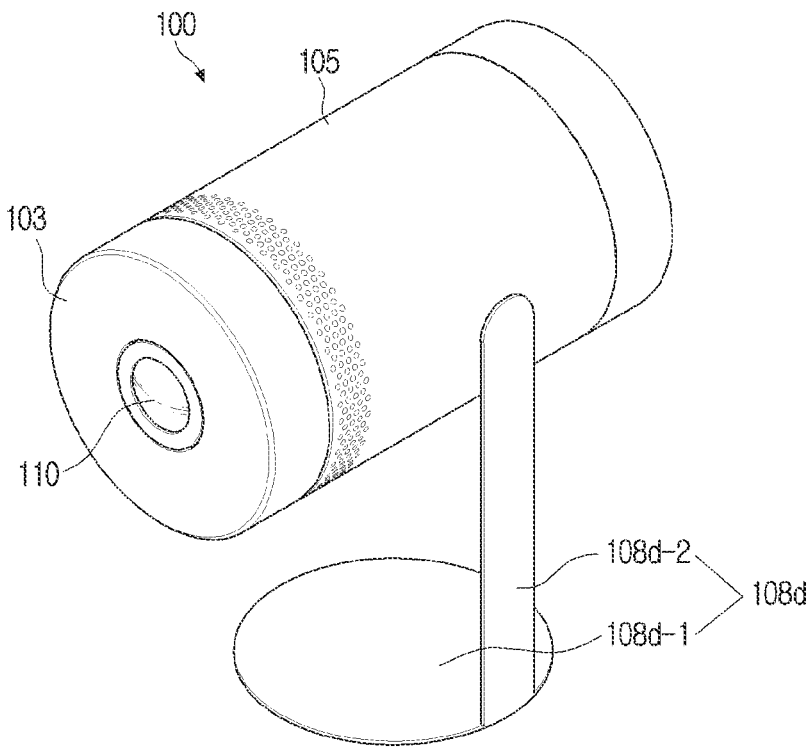
FIG. 6B is a perspective view illustrating a state in which the example electronic apparatus of FIG. 6A is rotated.

FIG. 6B is a perspective view illustrating a state in which the example electronic apparatus of FIG. 6A is rotated.

Referring to FIGS. 6A and 6B, a support 108*d* in various examples of the present disclosure may include a base plate 108*d*-1 supporting the electronic apparatus 100 on the ground and one support member 108*d*-2 connecting base plate 108*d*-1 with the main body 105.

In addition, a cross section of the one support member 108*d*-2 may be coupled to or separated from the main body by a groove and a hinge member provided on one outer circumferential surface of the main body 105.

In a case that the one support member 108*d*-2 and the main body 105 are coupled with each other by one hinge member, the main body 105 may be rotated based on a virtual horizontal axis formed by the one hinge member, as in FIG. 6B.

The supports illustrated in FIG. 3, 4, 5, 6A, or 6B are only examples, and the electronic apparatus 100 may include a support in various positions or shapes.

Figure 7A:
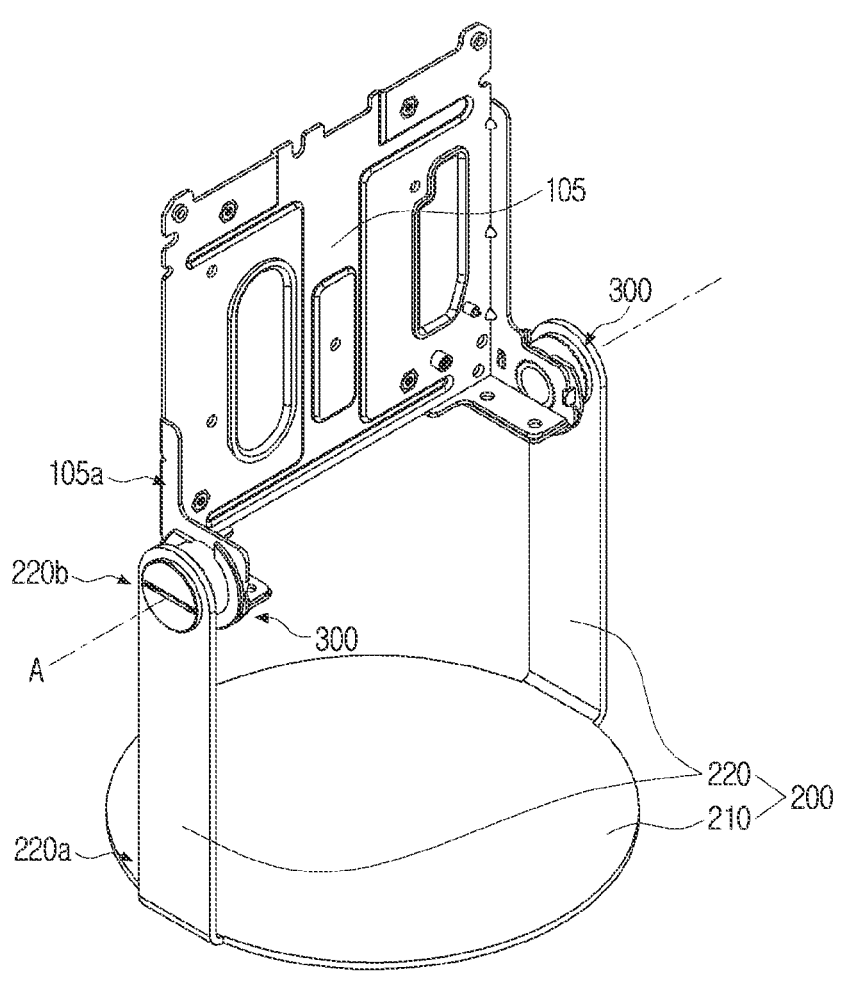
FIG. 7A is a perspective view illustrating a state before a main body of an example electronic apparatus is rotated with respect to a support member according to various embodiments.
Figure 7B:
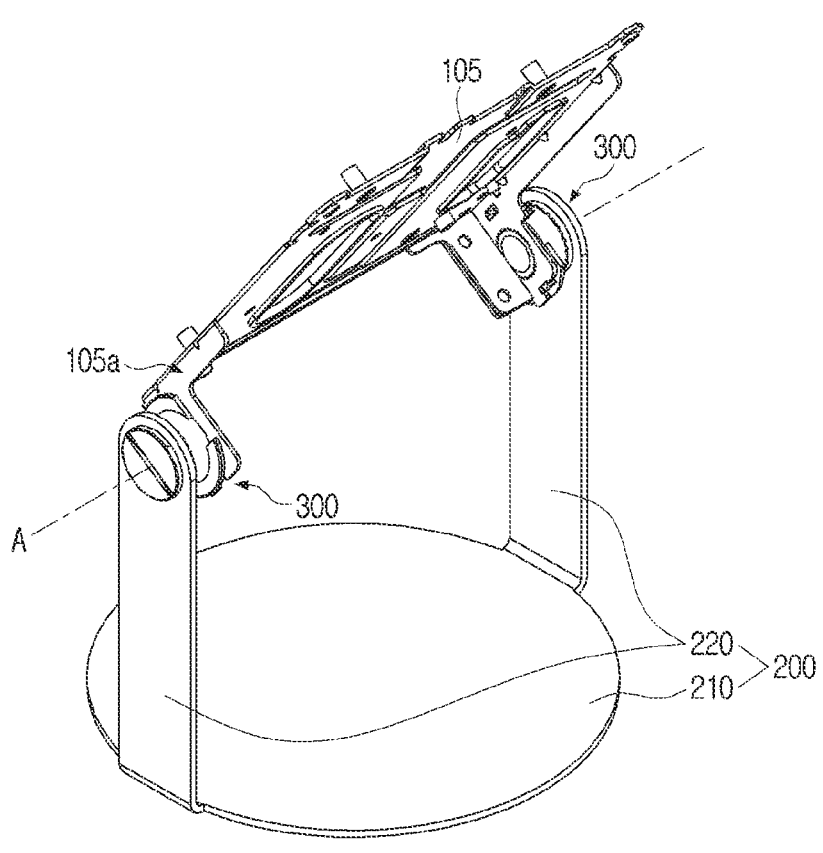
FIG. 7B is a perspective view illustrating a state in which the main body of FIG. 7A is rotated with respect to the support member.

FIG. 7A is a perspective view illustrating a state before the main body of the electronic apparatus is rotated with respect to a support member according to various embodiments of the present disclosure. FIG. 7B is a perspective view illustrating a state in which the main body of FIG. 7A is rotated with respect to the support member.

Referring to FIGS. 7A and 7B, the electronic apparatus 100 according to various embodiments of the present disclosure may include a main body 105, a support 200, and a hinge module 300. For convenience of explanation, FIGS. 7A and 7B illustrate only an outer frame of the main body 105.

The main body 105 may have an upper surface where the projection lens 110 is disposed and a side surface 105*a* where a nut part (e.g., a nut) 121 is formed.

The support 200 may include a base plate 210 and a support member 220. The base plate 210 may be disposed horizontally to be in contact with the ground. The support member 220 may have a first end 220a connected to the base plate 210 and a second end 220b facing the side surface 105a of the main body 105. The support member 220 may extend vertically upward from the base plate 210.

The support member 220 may include a through hole 221 (FIG. 8A) formed in the second end 220b of the support member 220. A central axis of the through hole 221 may be the same as a rotation axis A defined by the hinge module 300.

A screw member 330 (e.g., a screw) may pass through the through hole 221 of the support member 220. For example, a head part (e.g., a head) of the screw member 330 may be disposed on one side of the through hole 221 of the support member 220, and a bolt part (e.g., a bolt) of the screw member 330 may be disposed on the other side of the through hole 221 of the support member 220.

A pair of support members 220 is illustrated as being provided to support both sides of the main body 105. However, the disclosure is not limited to this particular number of support members, and, for example, one support member 220 may be provided as illustrated in FIGS. 6A and 6B.

The hinge module 300 (e.g., a hinge) may connect the main body 105 to the support member 220 so as to be rotatable. The hinge module 300 may define the rotation axis A parallel to the base plate 210. The rotation axis A may be disposed horizontally.

The main body 105 may be rotated from a (first) posture of FIG. 7A to a (second) posture of FIG. 7B. In detail, the main body 105 may be disposed to be parallel to the support member 220 as in the posture of FIG. 7A. That is, the main body 105 may be disposed vertically. The main body 105 may then be disposed obliquely with respect to the support member 220 as in the posture of FIG. 7B. The main body 105 may be rotated, thus projecting a projection image in various directions from the projection lens 110 disposed on the upper surface of the main body 105.

Figure 8A:
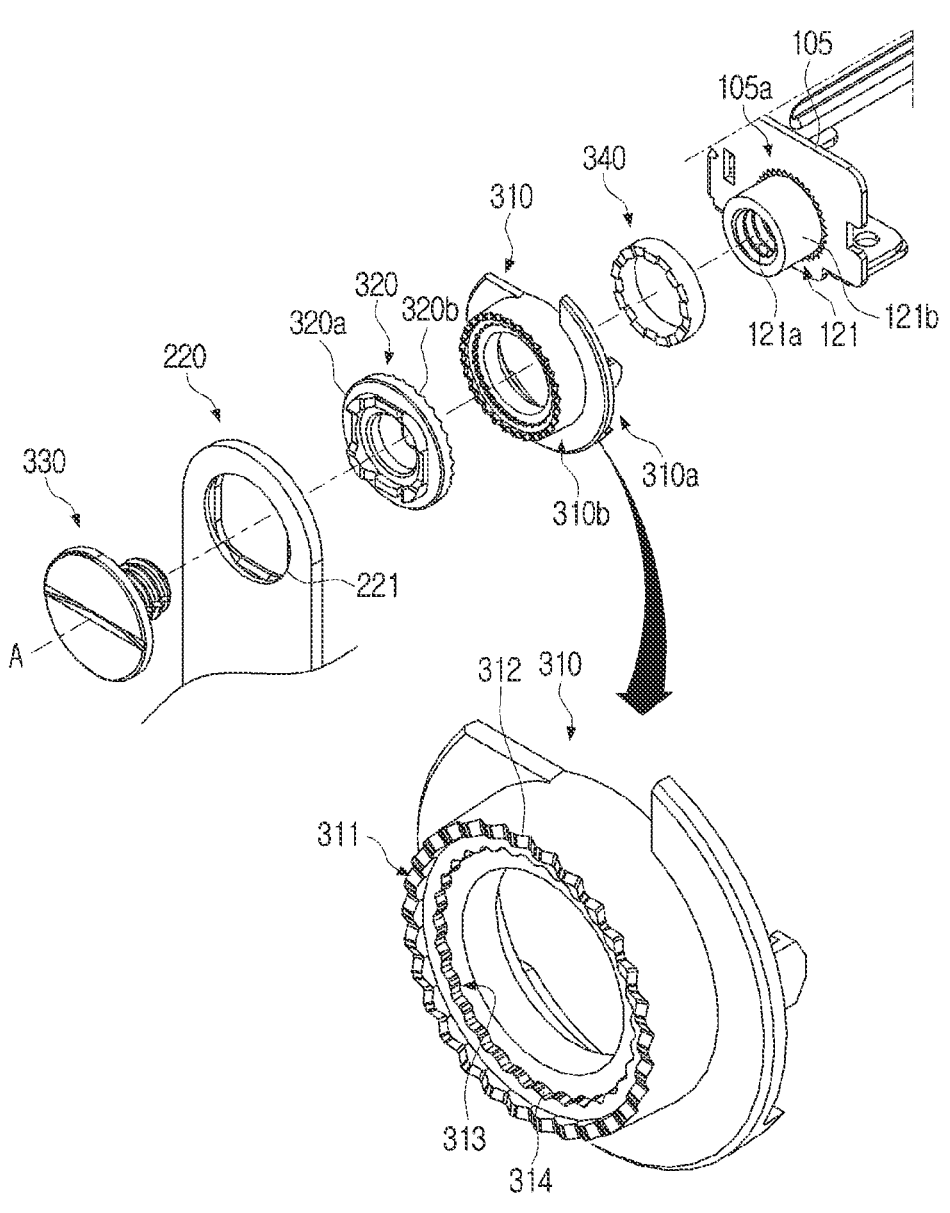
FIGS. 8A and 8B are exploded perspective views of an example hinge module according to various embodiments.
Figure 8B:
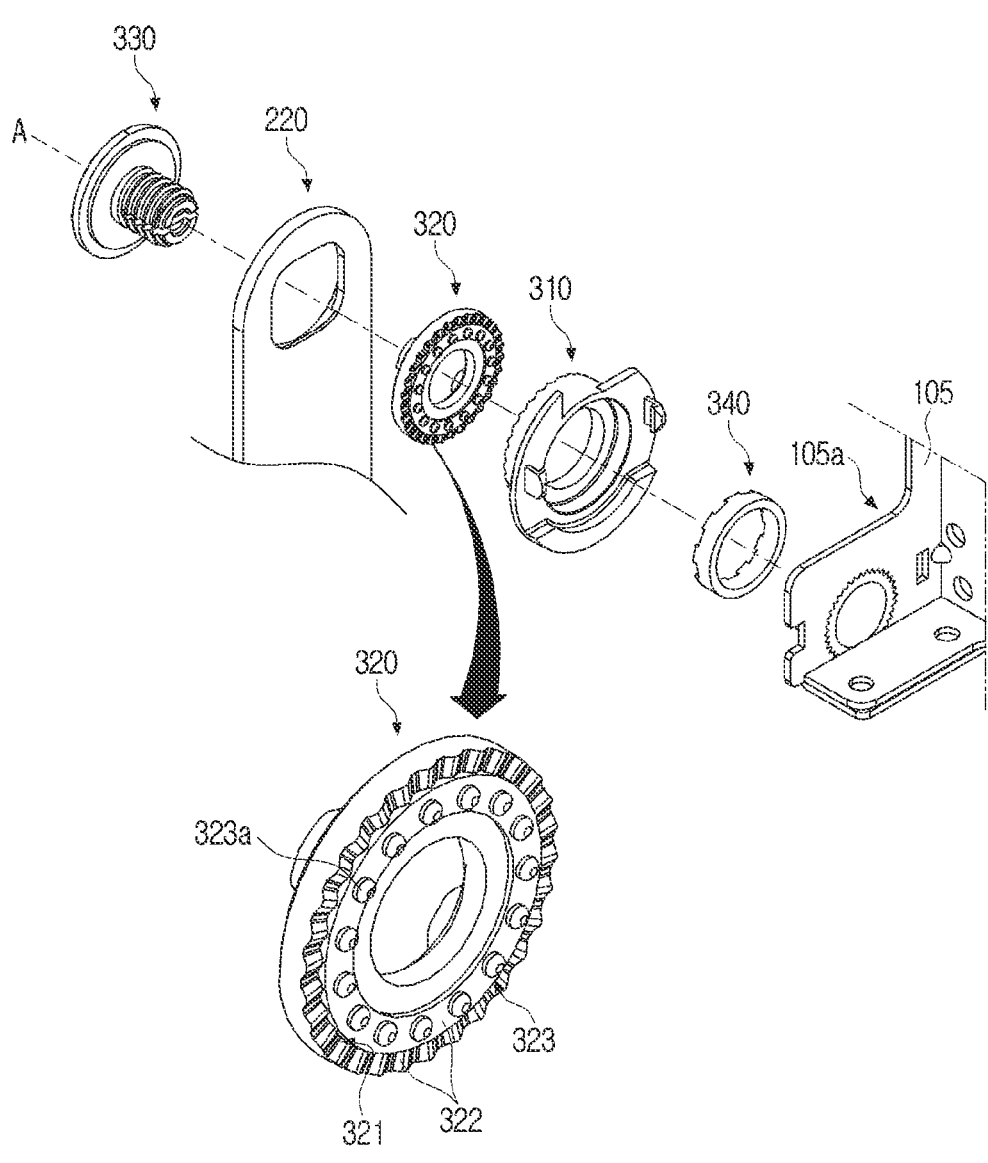
Figure 9A:
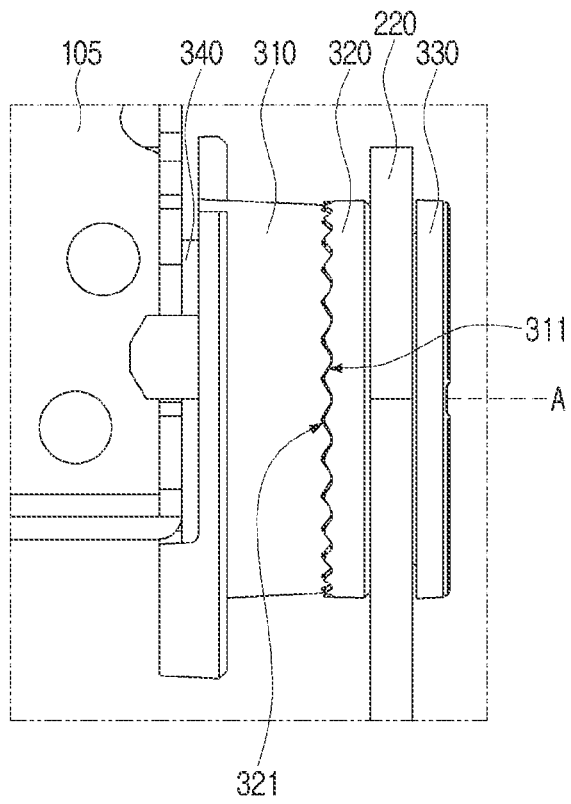
FIGS. 9A and 9B are side views illustrating a horizontal movement process based on a rotation of a first hinge member according to various embodiments.
Figure 9B:
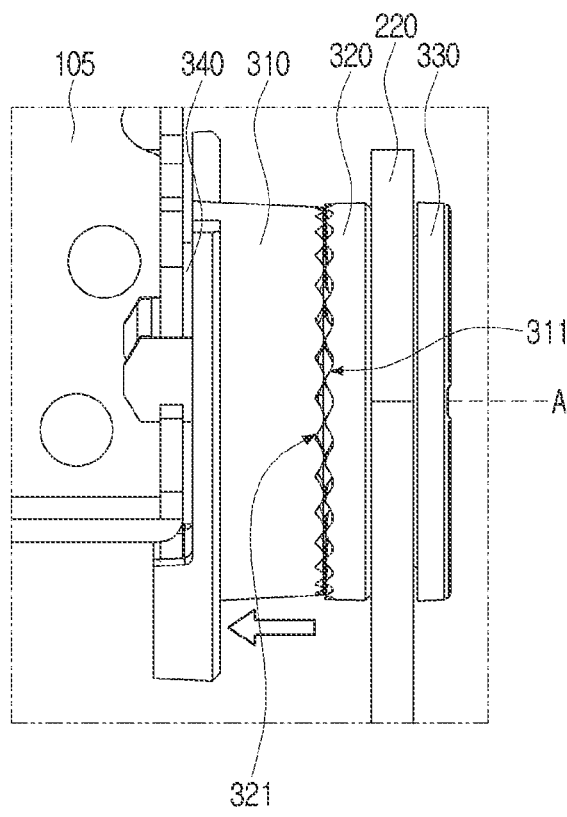

FIGS. 8A and 8B are exploded perspective views of an example hinge module according to an various embodiments of the present disclosure. FIGS. 9A and 9B are side views illustrating a horizontal movement process based on a rotation of a first hinge member.

Referring to FIGS. 8A, 8B, 9A, and 9B, the hinge module 300 may include a first hinge member 310, a second hinge member 320, and a screw member 330.

The first hinge member 310 may have a first side 310a fixed to the side surface 105a of the main body 105, and a second side 310b where a first teethed part 311 is formed in a circumferential direction. The circumferential direction may be a direction that rotates around the rotation axis A.

The first teethed part 311 may be formed at an edge of the first hinge member 310. The first teethed part 311 may have a shape in which valleys and mountains (peaks) are repeated. The first teethed part 311 may have a shape of a triangular mountain, but is not limited to this shape.

The second hinge member 320 may have a first side 320a fixed to the support member 220 and a second side 320b where a second teethed part 321 engaged with the first teethed part 311 is formed. The second teethed part 321 may have a shape in which valleys and mountains (peaks) are repeated. The second teethed part 321 may have the shape of a triangular mountain, but is not limited to this shape.

When the main body 105 is rotated, the first hinge member 310 fixed to the main body 105 may be rotated integrally with the main body 105. Even when the main body 105 is rotated, the second hinge member 320 fixed to the support member 220 may not be rotated integrally with the support member 220 and may maintain its fixed posture.

The first teethed part 311 may be rotated while being selectively engaged with the fixed second teethed part 321. The main body 105 may maintain a tilted posture with respect to the support member 220 when the first teethed part 311 is engaged with the second teethed part 321 after the main body 105 is rotated by a certain angle with respect to the support member 220.

In addition, while the first teethed part 311 and the second teethed part 321 are selectively engaged with each other, a user gripping and rotating the main body 105 may detect vibration occurring due to the first and second teethed parts 311 and 321 being engaged with each other. That is, the electronic apparatus 100 of the present disclosure may detect vibration based on the rotation of the main body 105 to thus provide a haptic effect to a user.

The screw member 330 may pass through the support member 220 and the second hinge member 320 to be engaged with the nut part 121. The screw member 330 may be disposed horizontally to be parallel to the rotation axis A. The screw member 330 may be engaged with the nut part 121 and rotated integrally with the main body 105.

The screw member 330 may support the main body 105 vertically upward. In detail, the screw member 330 may have one end supported by the support member 220, and the other end engaged with the nut part 121 and supporting the main body 105.

The first teethed part 311 may protrude in an axial direction from a first surface 312 of the first hinge member 310 that faces the support member 220, and the second teethed part 321 may protrude in the axial direction from a first surface 322 of the second hinge member 320 that faces the main body 105. The axial direction may be a direction parallel to the rotation axis A.

The hinge module 300 may include an elastic member 340 disposed between the main body 105 and the first hinge member 310 to press the first hinge member 310 toward the second hinge member 320.

Referring to FIG. 9A, the mountains of the first teethed part 311 and the valleys of the second teethed part 321 may be engaged with each other. In addition, referring to FIG. 9B, when the first hinge member 310 is rotated by a predetermined angle, the mountains of the first teethed part 311 and the mountains of the second teethed part 321 may be in contact with each other. Here, the first hinge member 310 of FIG. 9B may be moved to be closer to the main body 105 and further away from the position support member 220 of FIG. 9B than the first hinge member 310 of FIG. 9A. That is, the first hinge member 310 may be rotated and repeatedly moved forward or backward toward the main body 105 in the axial direction.

The elastic member 340 may press the first hinge member 310. Therefore, even when the user rotates the main body 105 with a small force, a specific mountain of the first teethed part 311 may be easily moved to be engaged with a first valley of the second teethed part 311 and then engaged with a second valley adjacent to the first valley.

In addition, the elastic member 340 may continuously press the first hinge member 310. Therefore, a fixing force between the first and second teethed parts 311 and 321 engaged with each other may be increased, thus preventing or reducing the possibility of the main body 105 from being unintentionally rotated.

The first hinge member 310 may include a third teethed part 313 (FIG. 8A) protruding from its inner surface 314 in a radial direction while crossing the first teethed part 311, and the second hinge member 320 may include a fourth teethed part 323 engaged with the third teethed part 313. The radial direction may be perpendicular to the rotation axis A, and may be a direction toward the rotation axis A.

The third teethed part 313 may protrude to cross the first teethed part 311. That is, mountains of the third teethed part 313 may correspond to valleys of the first teethed part 311, and valleys of the third teethed part 313 may correspond to mountains of the first teethed part 311.

Accordingly, the main body 105 may better maintain its posture at various rotation angles when the third and fourth teethed parts 313 and 323 are provided thereon compared to when only the first and the second teethed parts 311 and 321 are provided thereon. That is, the main body 105 may maintain the oblique posture because the third and fourth teethed parts 313 and 323 are engaged with each other even when the first and second teethed parts 311 and 321 are not engaged with each other.

The fourth teethed part 323 may include a plurality of interlocking protrusions 323a protruding in the axial direction from a first surface 322 of the second hinge member 320 that faces the main body 105 and arranged at a certain gap in the circumferential direction.

That is, the fourth teethed part 323 may have a gear shape corresponding to the third teethed part 323, but is not limited thereto, and may be implemented as the interlocking protrusions 323a having a shape corresponding to the valleys of the third teethed part 313.

The interlocking protrusions 323a may protrude from the first surface 322 of the second hinge member 320 in the axial direction, and have a hemispherical shape. As the first hinge member 310 is rotated, the plurality of interlocking protrusions 323a may be selectively engaged with the third teethed part 313.

The nut part 121 may have a cylindrical shape enabling the screw member 330 to be inserted into the inside 121a of the nut part, and the first hinge member 310 may surround an outer surface 123b of the nut part 121.

Figure 10:
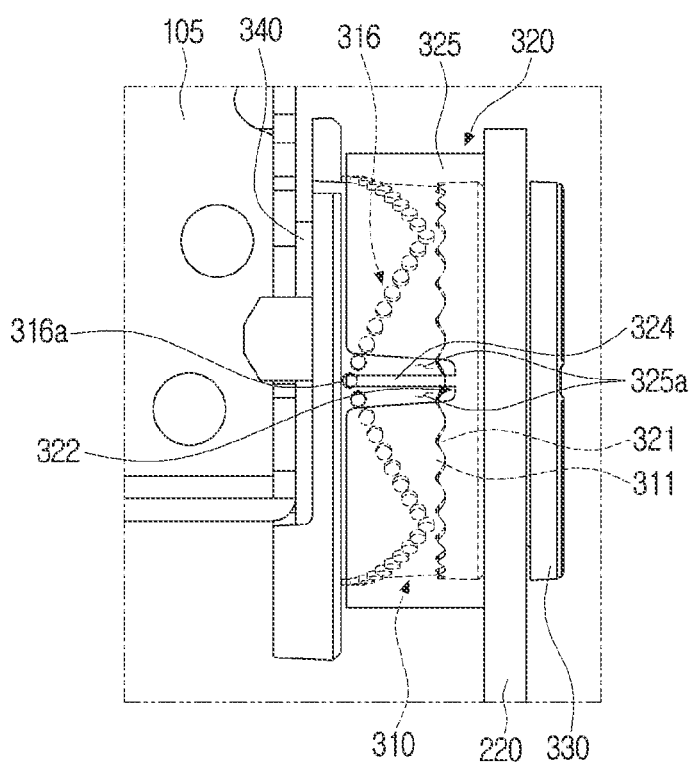
FIG. 10 is an exploded perspective view of an example hinge module illustrating its structure in which a sound is generated by collision between a key protrusion and a stick member as the main body is rotated.

FIG. 10 is an exploded perspective view of an example hinge module illustrating an example structure in which a sound is generated by collision between a key protrusion and a stick member as the main body is rotated according to various embodiments.

The first hinge member 310 may include a plurality of key protrusions 316 protruding from an outer surface of the first hinge member 310 in the radial direction and are disposed to be gradually further away from or closer to the main body 105 in the circumferential direction. The key protrusion 316 may have a hemispherical shape.

In addition, the second hinge member 320 may include a stick member 324 (e.g., a stick) protruding in the axial direction from its first surface 322 facing the main body 105, and generating the sound by its collision with the plurality of key protrusions 316 in turn when the first hinge member 310 is rotated.

The stick member 324 may have one end fixed to the first surface 322 of the second hinge member 320 and the other end formed as a free end.

A frequency may be increased to generate a high-pitched sound as an effective length of the stick member 324 is reduced when the stick member 324 collides with the key protrusion 316 at positions position adjacent to the first surface 322 of the second hinge member 320.

On the other hand, the frequency may be reduced to generate a low-pitched sound as the effective length of the stick member 324 is increased when the stick member 324 collides with the key protrusion 316 at positions further away from the first surface 322 of the second hinge member 320.

Accordingly, the user may perceive that the sound generated by the key protrusions 316 and the stick member 324 may be changed to high-pitched or low-pitched sounds as the main body 105 is rotated.

When the main body 105 has a first position where the main body 105 is parallel to the support member 220, the stick member 324 may be in contact with a first key protrusion among the plurality of key protrusions 316, and the plurality of key protrusions 316 may be gradually further away from or closer to the main body 105 as the key protrusion is further away from the first key protrusion. The first position may indicate the position of the main body 105 illustrated in FIG. 7A.

Figure 11:
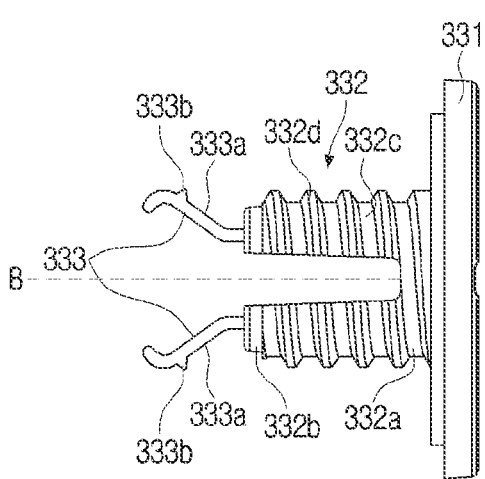
FIG. 11 is a perspective view of an example screw member including a guide part according to various embodiments.
Figure 12:
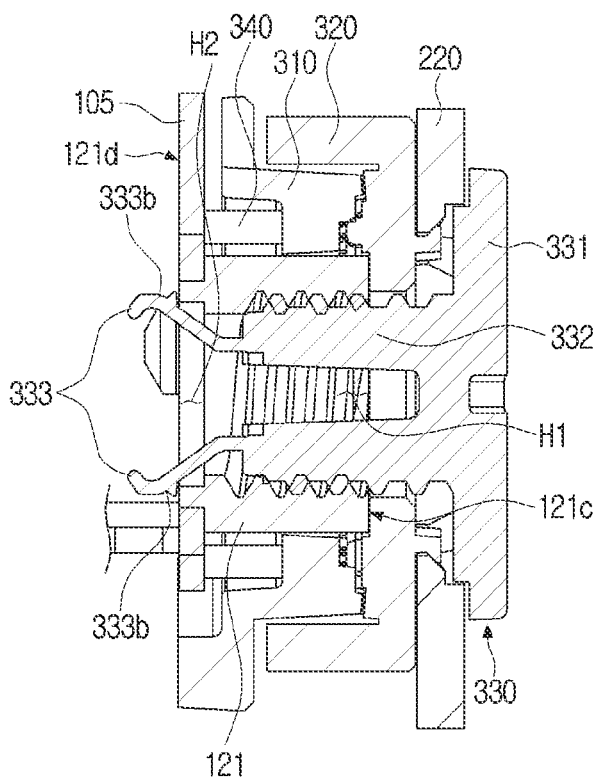
FIG. 12 is a cross-sectional view illustrating an example structure in which the screw member of FIG. 11 is coupled to a nut part.

FIG. 11 is a perspective view of an example screw member including a guide part according to various embodiments of the present disclosure. FIG. 12 is a cross-sectional view illustrating an example structure in which the screw member of FIG. 11 is coupled to the nut part.

The screw member 330 may include a head part 331 (e.g., a head) disposed outside the support member 220, a fastening part 332 (e.g., a fastener) having a first end connected to the head part 331 and an outer surface on which a thread is formed, and a pair of guide parts 333 facing each other and extending from a second end of the fastening part 332 to be further away from a central axis of the screw member 330.

The nut part 121 may include a first hole H1 disposed in a first surface 121c facing the support member 220, and a second hole H2 disposed in a second surface 121d and passed through by the guide part 333. A thread engaged with the fastening part 332 of the screw member 330 may be disposed in the first hole H1 of the nut part 121. The second hole H2 of the nut part 121 may communicate with the first hole H1.

The guide part 333 may include a fastening protrusion 333b protruding from its outer surface 333a and in contact with the second surface 121d of the nut part 121. When the screw member 330 is fastened to the nut part 121, the guide part 333 may pass through the second hole H2, and the fastening protrusion 333b may be supported on the second surface 121d of the nut part 121.

Accordingly, the screw member 330 may be more stably fixed to the nut part 121, thus preventing or reducing the screw member 330 from becoming unintentionally loosened from the nut part 121 or the main body 105.

Figure 13A:
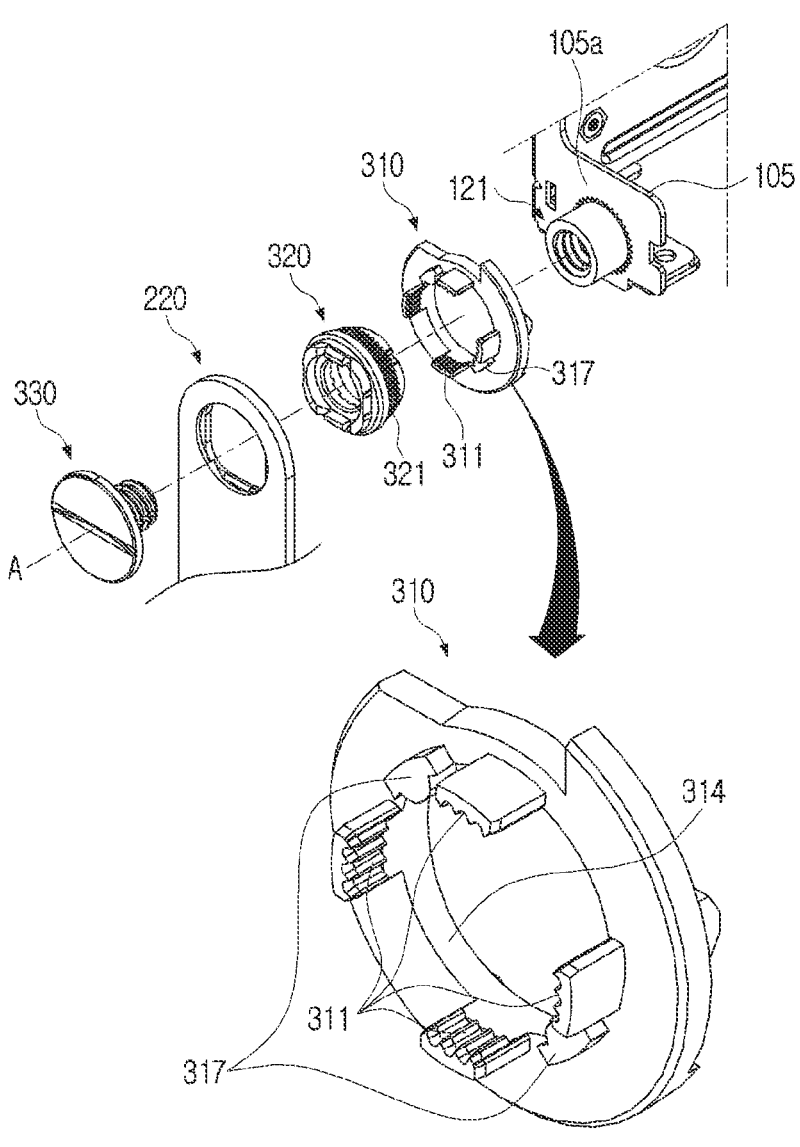
FIGS. 13A and 13B are exploded perspective views of an example hinge module according to various embodiments.
Figure 13B:
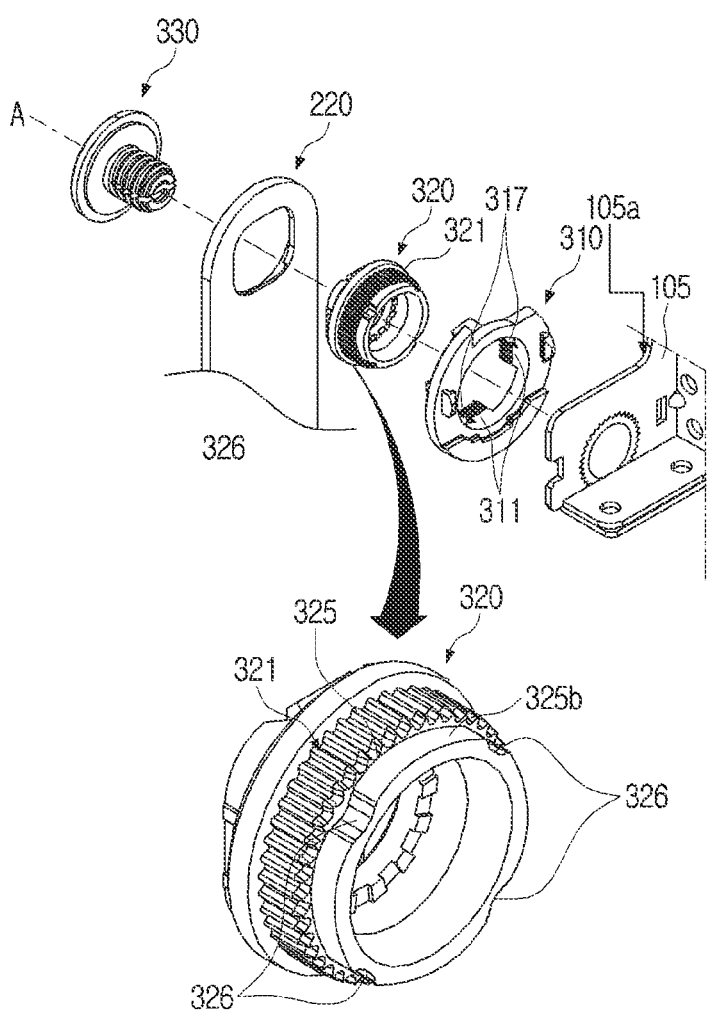
Figure 14:
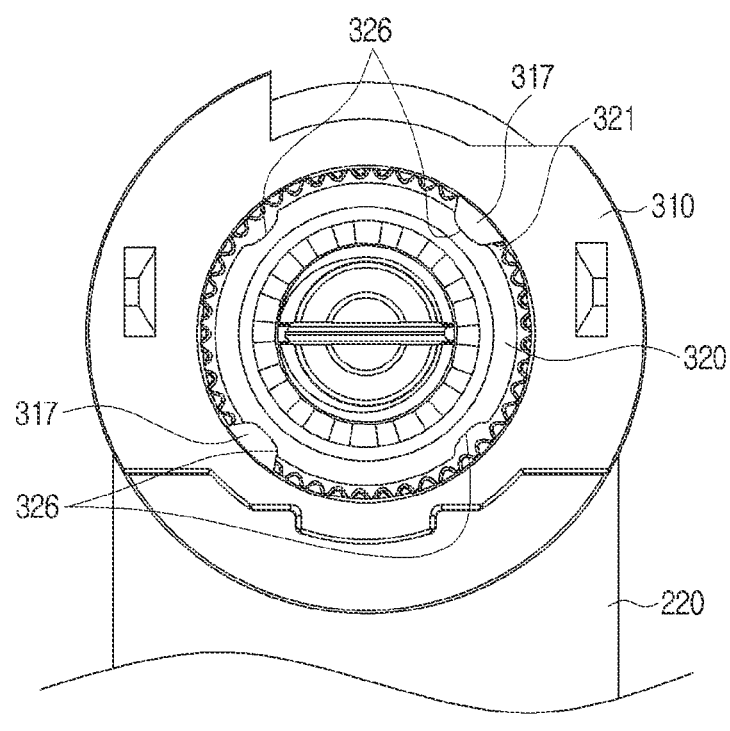
FIG. 14 is a front view illustrating an example structure in which a guide protrusion of the first hinge member is inserted into a groove of a second hinge member according to various embodiments.

FIGS. 13A and 13B are exploded perspective views of an example hinge module according to various embodiments of the present disclosure. FIG. 14 is a front view illustrating an example structure in which a guide protrusion of the first hinge member is inserted into a groove of the second hinge member.

The first teethed part 311 may protrude in the radial direction from the inner surface 314 of the first hinge member 310, and the second teethed part 321 may protrude in the radial direction from an outer surface 325 of the second hinge member 320. The inner surface 314 of the first hinge member 310 and the outer surface of the second hinge member 320 may face each other.

When the main body 105 is rotated, the first hinge member 310 fixed to the main body 105 may be rotated integrally with the main body 105. The screw member 330 may also be fastened to the nut part 121 disposed on a first surface 105*a* of the main body 105 and may be rotated integrally with the main body 105 and the first hinge member 310.

Even when the main body 105 is rotated, the second hinge member 320 fixed to the support member 220 may not be rotated integrally with the support member 220 and may maintain its fixed posture.

Here, the first teethed part 311 may be rotated while being selectively engaged with the fixed second teethed part 321. The main body 105 may maintain the tilted posture with respect to the support member 220 when the first teethed part 311 is engaged with the second teethed part 321 after the main body 105 is rotated by a certain angle with respect to the support member 220.

In addition, while the first teethed part 311 and the second teethed part 321 are selectively engaged with each other, the user gripping and rotating the main body 105 may detect the vibration occurring due to the first and second teethed parts 311 and 321 being engaged with each other. That is, the example electronic apparatus 100 of the present disclosure may provide vibration based on the rotation of the main body 105 to thus provide a haptic effect to the user.

The first hinge member 310 may include a guide protrusion 317 protruding from the inner surface 314 in the radial direction. The guide protrusion 317 may have a convex shape toward the rotation axis A of the hinge module 300. The guide protrusion 317 may include two guide protrusions 317 disposed at the same distance from the rotation axis A and facing each other. However, the number of the guide protrusions 317 is not limited thereto.

The second hinge member 320 may include a groove 326 disposed in one area 325*b* of its outer surface 325 and having a shape enabling the groove to be engaged with the guide protrusion 317. The groove 326 may have a concave shape and be engaged with the guide protrusion 317. The groove 326 of the second hinge member 320 may be closer to the main body 105 than the second teethed part 321.

The guide protrusion 317 may be selectively inserted into the groove 326 as the first hinge member 310 is rotated. For example, as a user rotates the main body 105, the first hinge member 310 may be rotated by a specified angle (for example, 0 degrees, 90 degrees, or 180 degrees). In this case, the guide protrusion 317 may be inserted into the groove 326, and sound may be generated by collision between the guide protrusion 317 and the groove 326. In addition, the user may be required to rotate the main body 105 with a greater force than usual to cause the guide protrusion 317 to be deviated from the groove 326.

Accordingly, the user may receive feedback on the rotation angle of the main body 105 by rotating the main body 105 and perceiving sound and the increased fixing force generated by the guide protrusion 317 and the groove 326.

The plurality of grooves 326 may be spaced apart from each other by a gap of 90 degrees in the circumferential direction. For example, the grooves 326 may include four grooves 326 disposed in the second hinge member 320 while having a certain gap therebetween in the circumferential direction, but are not limited to this number.

At least one area of the guide protrusion 317 or at least one area of the second hinge member 320 may be made of a flexible material. Accordingly, at least one area of the guide protrusion 317 or at least one area of the second hinge member 320 may be deformed as the first hinge member 310 is rotated, and the guide protrusion 317 may be easily deviated from the groove 326.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a main body having an upper surface at which a projection lens is disposed and a side surface at which a nut is disposed;
a support including a base plate and a support member having first end connected to the base plate and a second end facing the side surface of the main body; and
a hinge module configured to rotatably connect the main body to the support member,
wherein the hinge module comprises:
a first hinge member having a first end fixed to the side surface of the main body and a second end at which a first teethed part is formed comprising first teeth disposed in a circumferential direction,
a second hinge member having a first end fixed to the support member and a second end at which a second teethed part comprising second teeth engaged with the first teeth of the first teethed part is formed, and
a screw passing through the support member and the second hinge member to be engaged with the nut.

2. The electronic apparatus as claimed in claim 1, wherein the first teethed part protrudes in an axial direction from a first surface of the first hinge member that faces the support member, and
the second teethed part protrudes in the axial direction from a first surface of the second hinge member that faces the main body.

3. The electronic apparatus as claimed in claim 2, wherein the hinge module comprises an elastic member disposed between the main body and the first hinge member and configured to press the first hinge member.

4. The electronic apparatus as claimed in claim 2, wherein the first hinge member comprises a third teethed part protruding from an inner surface thereof in a radial direction while crossing the first teethed part, and
the second hinge member includes a fourth teethed part engaged with the third teethed part.

5. The electronic apparatus as claimed in claim 4, wherein the fourth teethed part comprises a plurality of interlocking protrusions protruding in the axial direction from the first surface of the second hinge member that faces the main body and arranged with gaps therebetween in the circumferential direction.

6. The electronic apparatus as claimed in claim 1, wherein the nut has a cylindrical shape configured to allow inserting of the screw into an inside of the nut, and
the first hinge member surrounds an outer surface of the nut.

7. The electronic apparatus as claimed in claim 1, wherein the first hinge member comprises a plurality of key protrusions protruding from an outer surface thereof in a radial direction and disposed so as to gradually become further away from or closer to the main body in the circumferential direction, and
the second hinge member includes a stick protruding in an axial direction from the first surface facing the main body, and configured to generate a sound by collision with the plurality of key protrusions when the first hinge member is rotated.

8. The electronic apparatus as claimed in claim 7, wherein when the main body has a first position in which the main body is parallel to the support member, the stick member is in contact with a first key protrusion among the plurality of key protrusions, and the plurality of key protrusions become gradually further away from or closer to the main body as the key protrusion is further away from the first key protrusion.

9. The electronic apparatus as claimed in claim 1, wherein the screw includes:

a head disposed outside the support member, a fastener having first end connected to the head and an outer surface on which a thread is formed, and a pair of guide parts facing each other and extending from a second end of the fastener to be further away from a central axis of the screw.

10. The electronic apparatus as claimed in claim 9, wherein the nut includes:

a first hole disposed in a first surface thereof facing the support member, and a second hole disposed in a second surface and configured for the guide part to pas through.

11. The electronic apparatus as claimed in claim 10, wherein the guide part comprises a fastening protrusion protruding from an outer surface thereof and configured for contacting the second surface of the nut.

12. The electronic apparatus as claimed in claim 1, wherein the first teethed part protrudes in a radial direction from an inner surface of the first hinge member, and the second teethed part protrudes in the radial direction from an outer surface of the second hinge member.

13. The electronic apparatus as claimed in claim 1, wherein the first hinge member includes a guide protrusion protruding from an inner surface thereof in a radial direction, the second hinge member comprises a groove disposed in one area of an outer surface thereof and configured for engaging the guide protrusion, and the guide protrusion is selectively received into the groove as the first hinge member is rotated.

14. The electronic apparatus as claimed in claim 13, wherein a plurality of grooves is spaced apart from each other by a gap of 90 degrees in the circumferential direction.

15. The electronic apparatus as claimed in claim 13, wherein at least one area of the guide protrusion or at least one area of the second hinge member comprises a flexible material.

* * * * *